(12) United States Patent
Tateyama et al.

(10) Patent No.: US 7,814,792 B2
(45) Date of Patent: Oct. 19, 2010

(54) GYRO-MODULE

(75) Inventors: Mitsuhiro Tateyama, Kamiina-gun (JP); Takayuki Kikuchi, Kamiina-gun (JP)

(73) Assignee: Epson Toyocom Corporation, Tokyo (JP)

(*) Notice: Subject to any disclaimer, the term of this patent is extended or adjusted under 35 U.S.C. 154(b) by 385 days.

(21) Appl. No.: 12/000,280

(22) Filed: Dec. 11, 2007

(65) Prior Publication Data
US 2008/0178673 A1 Jul. 31, 2008

(30) Foreign Application Priority Data
Jan. 26, 2007 (JP) .............................. 2007-016475

(51) Int. Cl.
G01P 9/04 (2006.01)
G01C 19/56 (2006.01)

(52) U.S. Cl. .................... 73/504.12; 73/504.16; 73/510

(58) Field of Classification Search .............. 73/504.02, 73/504.04, 504, 12, 504.15, 504.16, 510, 73/511
See application file for complete search history.

(56) References Cited

U.S. PATENT DOCUMENTS

| | | | | |
|---|---|---|---|---|
| 4,896,268 A * | 1/1990 | MacGugan | .................. | 701/220 |
| 4,996,877 A * | 3/1991 | Stewart et al. | ................. | 73/510 |
| 5,038,613 A * | 8/1991 | Takenaka et al. | ............... | 73/510 |
| 5,714,698 A * | 2/1998 | Tokioka et al. | ............... | 73/865.4 |
| 5,847,487 A * | 12/1998 | Maeno | ........................ | 310/321 |
| 6,698,292 B2 * | 3/2004 | Kikuchi | ........................ | 73/662 |
| 7,237,169 B2 * | 6/2007 | Smith | .......................... | 714/742 |
| 7,299,695 B2 * | 11/2007 | Tanaka et al. | .................. | 73/510 |

FOREIGN PATENT DOCUMENTS

| JP | A-07-306047 | 11/1995 |
|---|---|---|
| JP | A-2003-028646 | 1/2003 |

* cited by examiner

*Primary Examiner*—Helen C. Kwok
(74) *Attorney, Agent, or Firm*—Oliff & Berridge, PLC

(57) ABSTRACT

A gyro-module includes: a first gyro element component having a first detection axis and a second detection axis, and outputting at least a signal that is based on angular velocity around the first detection axis and the second detection axis; a second gyro element component having a first detection axis and a second detection axis, and outputting at least a signal that is based on angular velocity around the first detection axis and the second detection axis; a third gyro element component having a first detection axis; a first operation circuit conducting an operation of an output signal from the first gyro element component and an output signal from the third gyro element component; and a second operation circuit conducting an operation of an output signal from the second gyro element component and an output signal from the third gyro element component.

The first gyro element component, the second gyro element component and the third gyro element component are arranged in such a way that the first detection axis of the first gyro element component, the first detection axis of the second gyro element component and the first detection axis of the third gyro element component extend in a same direction and a direction in which the second detection axis of the first gyro element component is extended crosses with a direction in which the second detection axis of the second gyro element component is extended.

8 Claims, 11 Drawing Sheets

GYRO-MODULE

BACKGROUND OF THE INVENTION

1. Technical Field

The present invention relates to a triaxial gyro-module.

2. Related Art

A gyro sensor in which more than one sensor element with a single detection axis combined was used in order to perform a multiaxial detection. JP-A-2003-28646 is a first example of related art. The first example discloses a multiaxial semiconductor sensor having three sensor blocks that are adhered together and fixed. Each sensor block has a semiconductor sensor (an angular velocity sensor or an acceleration sensor) that is capable of conducting an uniaxial detection. JP-A-7-306047 is a second example of related art. The second example discloses a multiaxial detection type gyro sensor having more than one substrate on which a vibrating gyroscope and a signal processing circuit are provided. Among the substrates, one of the substrates is set as a base plane and the other substrates are set up with respect to the base plane so as to form a configuration such as a quadrangular prism and a square column. By forming a configuration, the multiaxial detection type gyro sensor according to the second example can conduct a rotational angular velocity detection in multiaxial directions.

The gyro sensors according to the examples are equipped with uniaxial detection sensor elements. Thereby one sensor element must be provided perpendicular to the other sensors in order to conduct the triaxial detection. When two sensor elements stand up perpendicular to one sensor element, the height of the standing sensor elements relates to the width of the main plane of the sensor element. This means that it is not possible to make the height of the gyro sensor smaller enough even if thinner sensor elements are adopted.

In recent years, downsizing and more sophisticated features are requested for electronic equipment in which the multiaxial detection type gyro sensor is mounted. The number of electronic components including the gyro sensor mounted on the electronic equipment is increasing. Under such circumstances, downsizing of the electronic components is requested and so is the gyro sensor.

SUMMARY

An advantage of the present invention is to provide a gyro module which is capable of conducting the triaxial angular velocity detection.

Gyro-module according to a first aspect of the invention includes: a first gyro element component having a first detection axis and a second detection axis, and outputting at least a signal that is based on angular velocity around the first detection axis and the second detection axis;

a second gyro element component having a first detection axis and a second detection axis, and outputting at least a signal that is based on angular velocity around the first detection axis and the second detection axis;

a third gyro element component having a first detection axis;

a first operation circuit conducting an operation of an output signal from the first gyro element component and an output signal from the third gyro element component; and a second operation circuit conducting an operation of an output signal from the second gyro element component and an output signal from the third gyro element component, wherein the first gyro element component, the second gyro element component and the third gyro element component are arranged in such a way that the first detection axis of the first gyro element component, the first detection axis of the second gyro element component and the first detection axis of the third gyro element component extend in a same direction and a direction in which the second detection axis of the first gyro element component is extended crosses with a direction in which the second detection axis of the second gyro element component is extended.

In this case, the first operation circuit conducts either subtraction or addition, and the second operation circuit conducts either subtraction or addition.

According to the first aspect of the invention, it is possible to separate the signals outputted from the gyro element components into angular velocity components around the three detection axes, and to obtain the three axes outputs. Furthermore, the third gyro element has the single detection axis whereas the first and second gyro element components have the two detection axes. Thereby two gyro element components out of the three do not have to be stood out in order to conduct a triaxial detection like a conventional one did. Three gyro element components are used to separate the angular velocity components around the three detection axes in the gyro module. The first detection axes of the gyro element components are aligned in the same direction and the second detection axes are crossed each other in the gyro module. Thereby the main planes of the gyro element components just need to be directed in the same direction or the opposite direction each other. Accordingly, it is not necessary to have the gyro element component standing in the module. Consequently, it is possible to lower the height of the triaxial gyro element components.

In this case, the first gyro element component, the second gyro element component and the third gyro element component respectively may include: a base part; two connecting arms that extend from the base part symmetrically with respect to the base part; a drive arm that extends from the connecting arm symmetrically with respect to the connecting arm; and two detection arms that extend from the base part symmetrically with respect to the base part and in a direction orthogonal to the connecting arm, wherein the first gyro element component and the second gyro element component may have a weight part on the detection arm. In this way, the gyro element component is formed as the double T-type gyro censor and thereby it is possible to downsize the gyro element component.

In this case, the first gyro element component, the second gyro element component and the third gyro element component respectively may include: a base part; two connecting arms that extend from the base part symmetrically with respect to the base part; a drive arm that extends from the connecting arm symmetrically with respect to the connecting arm; and two detection arms that extend from the base part symmetrically with respect to the base part and in a direction orthogonal to the connecting arm, wherein the first gyro element component and the second gyro element component may have a weight part on the detection arm, the weight part having a larger width than a width of the detection arm. In this way, the gyro element component is formed as the double T-type gyro censor and the ratio of the detection sensitivity of the first detection axis to the second detection axis becomes 1:1. Thereby it is possible to downsize the gyro element component and to improve the sensitivity.

Alternatively, at least one of the first gyro element component, the second gyro element component and the third gyro element component may be a double-ended tuning fork shaped vibrating gyro sensor. The double-ended tuning fork shaped vibrating gyro sensor can detect the angular velocity around the y-axis and the z-axis. The gyro module according to the invention can adopt the double-ended tuning fork shaped vibrating gyro sensor as the gyro element component.

Furthermore, the gyro element components can be made from a quartz substrate and the two detection axes of each gyro element component can be an optical axis and a mechanical axis. In this way, the signal outputted from the gyro element component can be separated into an angular velocity component around the optical axis and an angular velocity component around the mechanical axis.

It is preferable that first detection axis of the first gyro element component, the first detection axis of the second gyro element component and the first detection axis of the third gyro element component have a same polarity in their detection sensitivity, and the first operation circuit and the second operation circuit be subtraction circuits.

When the output signal of the third gyro element component is subtracted from the output signal of the first gyro element component, the angular velocity around the first detection axes of these gyro element components can be canceled. As a result, the angular velocity component around the second detection axis of the first gyro element component can be obtained. In the same manner, when the output signal of the third gyro element component is subtracted from the output signal of the second gyro element component, the angular velocity component around the second detection axis of the second gyro element component can be obtained. And the angular velocity component around the first detection axis can be obtained from the third gyro element component. In this way, three axis outputs can be obtained.

Alternatively, the first detection axis of the first gyro element component and the first detection axis of the second gyro element component may have a same polarity in their detection sensitivity, the polarity in the detection sensitivity of the first detection axis of the first gyro element component may be reversed to a detection sensitivity polarity of the first detection axis of the third gyro element component, and the first operation circuit and the second operation circuit are adder circuits.

In this way, the adder circuits conduct addition of the signals outputted from the gyro element components so as to obtain the angular velocity component around the second detection axis of the first gyro element component and the angular velocity component around the second detection axis of the second gyro element component. And the angular velocity component around the first detection axis can be obtained from the third gyro element component. Consequently, three axis outputs can be obtained.

Alternatively, the first detection axis of the first gyro element component and the first detection axis of the third gyro element component may have a same polarity in their detection sensitivity, a polarity in the detection sensitivity of the first detection axis of the second gyro element component may be reversed to the detection sensitivity polarity of the first detection axis of the third gyro element component, the first operation circuit is a subtraction circuit, and the second operation circuit is an adder circuit.

In this way, when the signal outputted from the third gyro element component is subtracted from the signal outputted from either the first gyro element component or the second gyro element component, the angular velocity around the first detection axis of the first gyro element component or the second gyro element component can be canceled. As a result, the angular velocity component around the second detection axis of the other gyro element component can be obtained. In the same manner, when the output signal of the third gyro element component is added to the output signal from the other gyro element component, the angular velocity component around the first detection axis of the other gyro element component can be canceled. As a result, the angular velocity component around the second detection axis of the other gyro element component can be obtained. And the angular velocity component around the first detection axis can be obtained from the third gyro element component. In this way, three axis outputs can be obtained.

A gyro-module according to a second aspect of the invention includes:

a first gyro element component having a first detection axis and a second detection axis, and outputting at least a signal that is based on angular velocity around the first detection axis and the second detection axis;

a second gyro element component having a first detection axis and a second detection axis, and outputting at least a signal that is based on angular velocity around the first detection axis and the second detection axis;

a fourth gyro element component having a first detection axis and a second detection axis, and outputting at least a signal that is based on angular velocity around the first detection axis and the second detection axis;

a third operation circuit conducting subtraction of an output signal from the second gyro element component and an output signal from the fourth gyro element component, and outputting a subtraction result;

a fourth operation circuit conducting addition of an output signal from the second gyro element component and an output signal from the fourth gyro element component, and outputting an addition result; and a fifth operation circuit conducting an operation of an output signal from the first gyro element component and an output signal from the third gyro element component, and outputting an operation result, wherein the first gyro element component, the second gyro element component and the fourth gyro element component are arranged in such a way that the first detection axis of the first gyro element component, the first detection axis of the second gyro element component and the first detection axis of the fourth gyro element component extend in a same direction, and a direction in which the second detection axis of the first gyro element component is extended crosses with a direction in which the second detection axis of the second gyro element component is extended.

In this way, where each gyro element component only have two detection axes, the three axes outputs can be obtained by adding/subtracting the signals outputted from the gyro element components.

In this case, the first gyro element component, the second gyro element component and the fourth gyro element component respectively may include: a base part; two connecting arms that extend from the base part symmetrically with respect to the base part; a drive arm that extends from the connecting arm symmetrically with respect to the connecting arm; two detection arms that extend from the base part symmetrically with respect to the base part and in a direction orthogonal to the connecting arm; and a weight part that is provided on the detection arm.

In this way, it is possible to downsize the gyro element component and to improve the sensitivity.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be described.

First Embodiment

Figure 1:
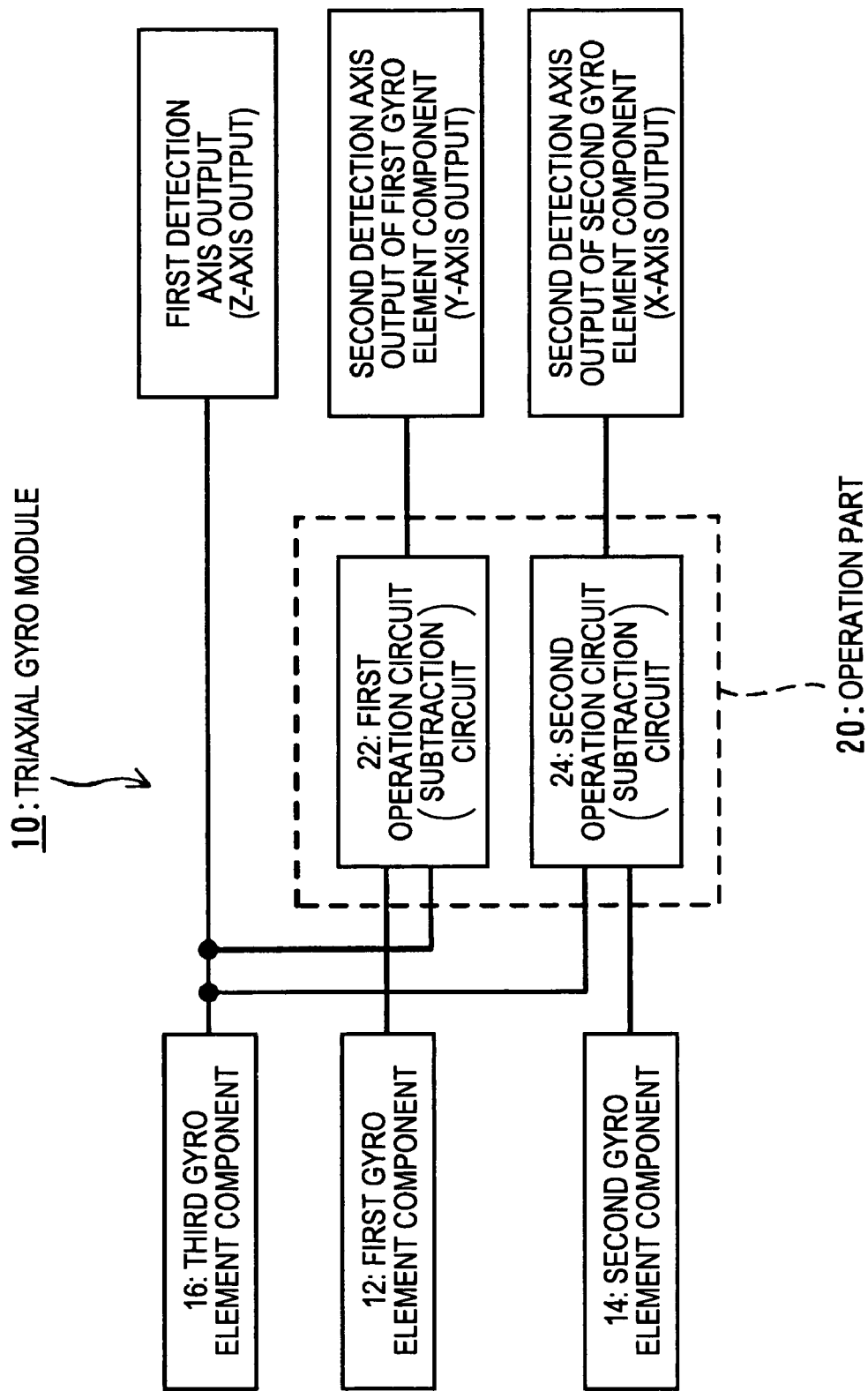
FIG. 1 is a block diagram of a gyro-module according to a first embodiment of the invention.

FIG. 1 is a block diagram of a gyro module according to a first embodiment of the invention. A triaxial gyro module 10 has three gyro element components. Among these three gyro element components, a first gyro element component 12 and a second gyro element component 14 have two detection axes (a first detection axis and a second detection axis). The rest, which is a third gyro element component 16, has a single detection axis (a first detection axis).

The three gyro element components are arranged such that their first detection axes extend in the same direction. In the example shown in FIG. 1, the directions of the first axes are the same so that polarity of detection sensitivity of each gyro element component with respect to the angular velocity around the first detection axis is the same. The first gyro element component 12 and the second gyro element component 14 are arranged such that their second detection axes cross each other. In order to conduct the angular velocity detection with respect to the three axes which orthogonally cross each other, the second detection axis of the first gyro element component 12 orthogonally crosses the second detection axis of the second gyro element component 14 in the triaxial gyro module 10 according to the embodiment. Furthermore, the first detection axis orthogonally crosses the second detection axis. This means that the first detection axis of each gyro element component, the second detection axis of the first gyro element component 12 and the second detection axis of the second gyro element component 14 meet orthogonal each other. In this embodiment, the first detection axis of each gyro element component corresponds to a Z-axis of the triaxial gyro module 10, the second detection axis of the first gyro element component 12 corresponds to a Y-axis of the triaxial gyro module 10, and the second detection axis of the second gyro element component 14 corresponds to a X-axis of the triaxial gyro module 10.

An oscillation circuit (unshown in the drawings) is coupled to the above-described gyro element component. The oscillation circuit is provided in order to excite the gyro element component. An operation part 20 is coupled to an output side of the gyro element component. The operation part 20 includes a first operation circuit 22 and a second operation circuit 24. In the example shown in FIG. 1, the first and second operation circuits 22, 24 are subtraction circuits.

The first operation circuit 22 is coupled to outputs of the first gyro element component 12 and the third gyro element component 16. The first operation circuit 22 conducts subtraction (operation) of signals which are inputted from the gyro element components 12, 16, and then outputs the result. The result outputted by the first operation circuit 22 is the detection result of the angular velocity around the second detection axis of the first gyro element component 12, in other words, the Y-axis output of the triaxial gyro module 10. The second operation circuit 24 is coupled to outputs of the second gyro element component 14 and the third gyro element component 16. The second operation circuit 24 conducts subtraction (operation) of the signals which are inputted from the gyro element components 14, 16, and then outputs the result. The result outputted by the second operation circuit 24 is the detection result of the angular velocity around the second detection axis of the second gyro element component 14, in other words, the X-axis output of the triaxial gyro module 10. Moreover, the output result of the third gyro element component 16 is the detection result of the angular velocity around the first detection axis, in other words, the Z-axis output of the triaxial gyro module 10.

The circuit diagram in FIG. 1 only schematically shows the connections between the gyro element components and the operation circuits. Specific example of the circuits following the first-third gyro element components 12, 14, 16 and coupled thereof in the triaxial gyro module 10 will be a circuit including a charge amplifier circuit which converts the detection signal (electric charge) detected by the detection electrode of each gyro element component into a voltage signal and which is provided with respect to each detection arm (in other words two charge amplifier circuits are provided with respect to each gyro element component).

The triaxial gyro module 10 further includes a differential amplifier circuit, a synchronous detection circuit and a low-pass filter. The differential amplifier circuit amplifies the output signals from the above-mentioned two charge amplifier circuits, the synchronous detection circuit synchronously detects the output signal from the differential amplifier circuit and the output signal from the oscillator, and the low-pass filter removes high-frequency signals from the output of the synchronous detection circuit.

The triaxial gyro module 10 has a structure that supplies the output signal of the low-pass filter to the operation circuit. The triaxial gyro module 10 also has a structure that utilizes a part of the output signal of the third gyro element component 16 which passes through the low-pass filter as the first detection axis output.

Figure 2:
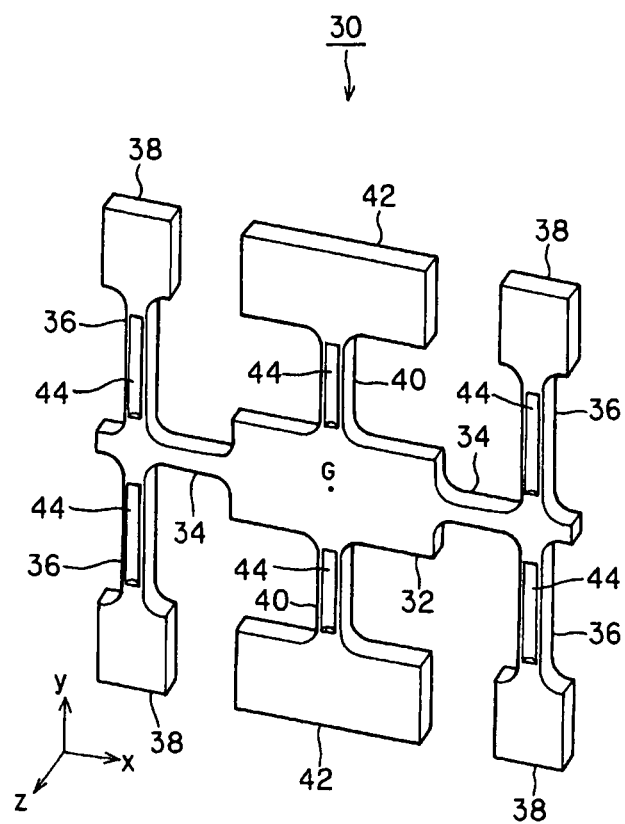
FIG. 2 is a schematic perspective view of a gyro element component that has two detection axes.

The detail structure of the gyro element component is now described. FIG. 2 is a schematic perspective view of a gyro element component that has two detection axes. The gyro element component having the two detection axes (a biaxial gyro element component 30), in other words, the first gyro element component 12 and the second gyro element component 14, are a so-called double T-type gyro sensors. The biaxial gyro element component 30 is formed of crystal and has a Z-cut quartz substrate which is sliced at an x-y plane defined by the x-axis (an electrical axis) and the y-axis (a mechanical axis) of the quartz crystal. This main plane of the quartz substrate is the main plane of the biaxial gyro element component 30. The orthogonal direction with respect to the x-y plane is the z-axis (an optical axis) of the quartz crystal.

The biaxial gyro element component 30 has a rectangular shaped base part 32 in the x-y plane. The base part 32 has a connecting arm 34 that extends in the x-y plane from the middle of the base part 32 side which is parallel to the y-axis and towards the direction parallel to the x-axis. More specifically, the base part 32 has the connecting arm 34 that extends in +x direction (the direction designated by the arrow in the x-axis) and the connecting arm 34 that extends in −x direction. The connecting arm 34 is formed so as to form a single body with the base part 32. The connecting arm 34 has a drive arm 36 which extends from around the end part of the connecting arm 34 and in the direction parallel to the y-axis in the x-y plane. More specifically, at the end part (the end part in the x-axis direction) or the middle (the middle in the x-axis direction) of the connecting arm 34, the drive arm 36 which extends in +y direction (the direction designated by the arrow in the y-axis) and the drive arm 36 that extends in −y direction symmetrically with the drive arm 36 that extends in the +y direction with respect to the connecting arm 34 exist. The drive arm 36 is formed together with the connecting arm 34. A weight part 38 that has a larger width in the x-axis direction compared with that of the drive arm 36 and has a rectangular shape is formed so as to form a single body with the drive arm 36 at the end part of the drive arm 36.

The base part 32 further has a detection arm 40 that extends from the middle of the side of the base part 32 where is parallel to the x-axis and toward the direction parallel to the y-axis in the x-y plane. More specifically, the base part 32 has the detection arm 40 which extends in +y direction and the detection arm 40 which extends in −y direction. The detection arm 40 is formed so as to form a single body with the base part 32. A weight part 42 that has a larger width in the x-axis direction compared with that of the detection arm 40 and has a rectangular shape is formed so as to form a single body with the detection arm 40 at the end part of the detection arm 40. The weight part 42 which is provided at the end part of the detection arm 40 has a larger width in the x-axis direction compared with that of the weight part 38 which is provided at the end part of the drive arm 36. When the width of the weight part 42 provided at the end part of the detection arm 40 is denoted as "D" and the width of the weight part 38 provided at the end part of the drive arm 36 is denoted as "d", the weight parts are formed so as to satisfy the relation "$5d \leq D \leq 10d$". In other words, the weight part 42 provided at the end part of the detection arm 40 is designed to have the width "D" which is 5-10 times as large as the width "d" of the weight part 38 provided at the end part of the drive arm 36. The width "D" of the weight part 42 provided at the end part of the detection arm 40 is set so as to obtain an efficient torsional vibration of the detection arm 40 when detection of the angular velocity in the y-axis rotation system is carried out.

The face of the drive arm 36 and the detection arm 40 where lies in parallel to the x-y plane have a groove 44 in the middle in the width of the x-axis direction. A metal film which serves as a driving electrode or a detection electrode is provided on the whole inner face of the groove 44. In this way, it is possible to efficiently form an electric field between the driving electrode or the detection electrode which is formed in the faces of the drive arm 36 and the detection arm 40 in the z-y plane and the electrode provided in the groove 44. Consequently, it is possible to downsize the biaxial gyro element component 30. As just mentioned above, the driving electrode (unshown in the drawings) is provided in each drive arm 36 and the detection electrode (unshown in the drawings) is provided in each detection arm 40. The driving electrode or the detection electrode is respectively coupled to a resonator element side mount electrode 46 (see FIG. 4) which is provided on the back side of the base part 32. The resonator element side mount electrode 46 becomes a connecting place where a package side electrode is coupled (where a lead of a middle substrate is coupled) when the biaxial gyro element component 30 is integrated in the package.

When an electric signal (a drive signal) from the oscillation circuit is supplied to the driving electrode through the resonator element side mount electrode 46 in the biaxial gyro element component 30, the drive arm 36 vibrates symmetrically in a flexure vibration (driving vibration) manner. More specifically, the drive arm 36 situated on the left hand side and the drive arm 36 situated on the right hand side in FIG. 2 vibrate in a line-symmetrical manner with respect to the line which lies parallel to the y-axis and penetrates the gravity center "G" of the gyro element component. Where an angular velocity around the z-axis is given to the biaxial gyro element component 30 which is vibrating in the driving vibration manner, Coriolis force in the y-axis direction works on the drive arm 36. The detection arm 40 starts the flexure vibration (detective vibration) affected by the Coriolis force and an electric signal is outputted through the detection electrode and from the resonator element side mount electrode 46. Where an angular velocity around the y-axis is given to the biaxial gyro element component 30 which is vibrating in the driving vibration manner, the detection arm 40 torsionally vibrates (detective vibration). This torsional vibration is the vibration mode of the detection arm 40 in which the flexure vibration in the x-axis direction generated by the Coriolis force and the flexure vibration in the z-axis direction are mixed. An electronic signal is generated by the torsional vibration and outputted through the detection electrode. Where the biaxial gyro element component 30 rotates around the x-axis, the Coriolis force is not working so that the electric signal is not outputted from the biaxial gyro element component 30.

The biaxial gyro element component 30 according to the embodiment has the above-mentioned structure thereby the detection sensitivity of the angular velocity around the z-axis becomes equal to the detection sensitivity of the angular velocity around the y-axis, in other words the ratio of the detection sensitivity becomes 1:1.

Figure 3:
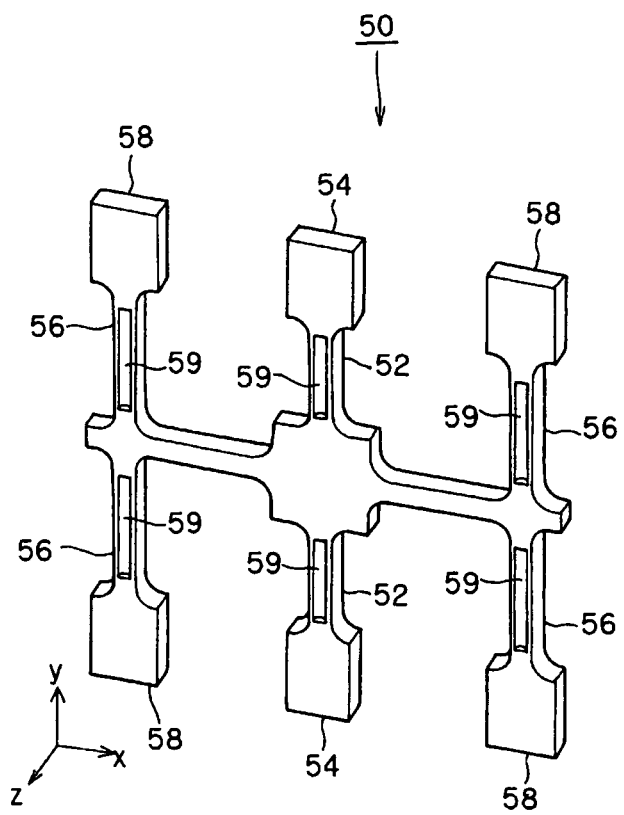
FIG. 3 is a schematic perspective view of a gyro element component that has a single detection axis.

FIG. 3 is a schematic perspective view of a gyro element component having a single detection axis. This gyro element component that has a single detection axis (uniaxial gyro element component 50), in other words the third gyro element component 16, is the so-called double T-type gyro sensor. The uniaxial gyro element component 50 has the same structure as that of the biaxial gyro element component 30 except for an x-axis direction width of a weight part 54 which is provided at the end part of a detection arm 52. More specifically, the width of the weight part 54 provided at the detection arm 52 in the uniaxial gyro element component 50 is smaller than the width of the weight part 42 provided at the detection arm 40 in the biaxial gyro element component 30. The width of the weight part 54 provided at the detection arm 52 in the uniaxial gyro element component 50 is set smaller in order to prevent the torsional vibration from occurring at the detection arm 52 because the uniaxial gyro element component 50 does not detect the angular velocity in the y-axis rotation system. When an electric signal is supplied to a driving electrode (unshown in the drawings) in the uniaxial gyro element component 50, a drive arm 56 vibrates symmetrically in a flexure vibration (driving vibration) manner. Where an angular velocity around the z-axis is given to the uniaxial gyro element component 50 which is vibrating in the flexure vibration manner, Coriolis force in the y-axis direction works on the drive arm 56. The detection arm 52 starts the flexure vibration (detective vibration) affected by the Coriolis force and an electric signal is outputted through a detection electrode (unshown in the drawings) of the uniaxial gyro element component 50 and from the resonator element side mount electrode 46. Though the uniaxial gyro element component 50 shown in FIG. 3 have the weight part 54 and a weight part 58 that are respectively provided on the end part of the detection arm 52 and the drive arm 56, the uniaxial gyro element component 50 can be formed without having the weight parts 54, 58 depending on an application.

Figure 4:
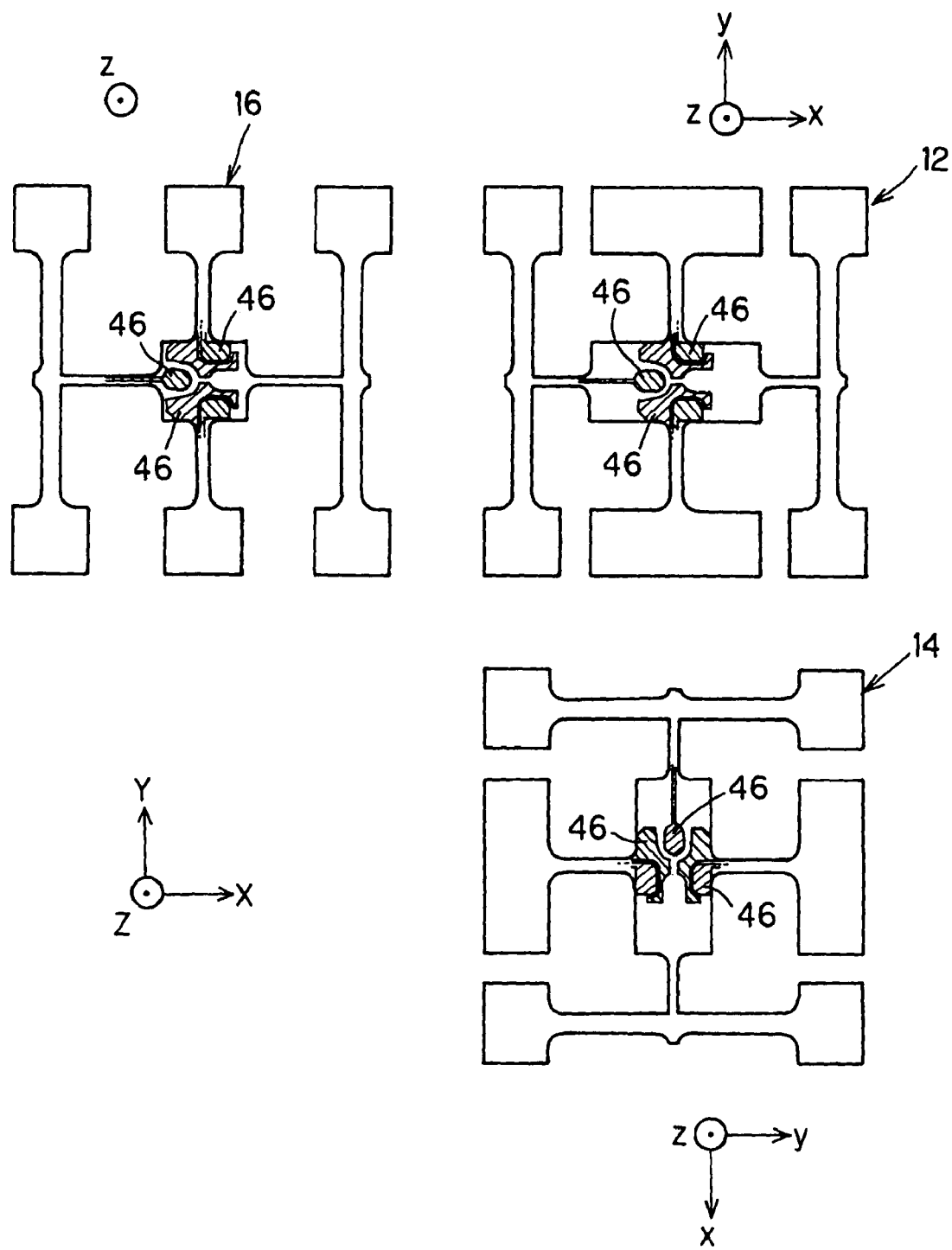
FIG. 4 is a schematic bottom view showing orientations of gyro element components which are arranged.

The biaxial gyro element component 30 and the uniaxial gyro element component 50 can be manufactured by using photolithography processing techniques thereby it is possible to downsize the gyro element component. Moreover, the gyro element components can also be downsized by providing the weight parts 38, 42, 54, 58 and the grooves 44, 59 on the detection arms 40, 52 and on the drive arms 36, 56. At the same time, it is also possible to increase the sensitivity of the gyro element.

Where the triaxial gyro module 10 is formed from the biaxial gyro element component 30 and the uniaxial gyro element component 50 as described above, the gyro element components 12, 14, 16 are placed such that each of the gyro element component faces the following direction. FIG. 4 is a schematic bottom view showing orientations of gyro element components which are arranged. Referring to FIG. 4, the third gyro element component 16 (the uniaxial gyro element component 50) is situated in the upper left in the drawing, the first gyro element component 12 (the biaxial gyro element component 30) is situated in the upper right in the drawing and the second gyro element component 14 (the biaxial gyro element component 30) is situated in the lower right in the drawing. The first gyro element component 12 and the second gyro element component 14 have the same structure including the relations of the crystal axis direction of the quartz. The third gyro element component 16 situated in the upper left in the drawing is arranged such that its +z direction lies orthogonal to the drawing and in the near side to the viewer of the drawing. The first gyro element component 12 situated in the upper right in the drawing is arranged such that its +z direction lies orthogonal to the drawing and in the near side to the viewer of the drawing, its +y direction points the upper side in the drawing, and its +x direction faces the right in the drawing. The second gyro element component 14 situated in the lower right in the drawing is arranged such that its +z direction lies orthogonal to the drawing and in the near side to the viewer of the drawing, its +y direction points the right in the drawing, and its +x direction faces the lower side in the drawing. When the gyro element components 12, 14, 16 are arranged in the above-mentioned way, the Z-axis of the triaxial gyro module 10 is directed orthogonal to the drawing and to the near side to the viewer of the drawing, the Y-axis is pointed upward in the drawing, and the X-axis faces toward the right in the drawing, as referring to the lower left drawing in FIG. 4.

The z-axes of the gyro element components 12, 14, 16 can be placed in a completely uniform direction. Alternatively, the z-axes of the gyro element components can be placed in substantially the same direction to the extent depending on the detection accuracy required for the triaxial gyro module 10. Moreover, the second detection axis of the first gyro element component 12 can be crossed orthogonally with the second detection axis of the second gyro element component 14. Alternatively, these second detection axes can cross substantially orthogonal to the extent depending on the detection accuracy required for the triaxial gyro module 10. If the z-axes are placed in the completely uniform direction and the second detection axis of the first gyro element component 12 is crossed very orthogonally with the second detection axis of the second gyro element component 14, it is possible to form the triaxial gyro module 10 with a high detection accuracy.

Figure 5A:
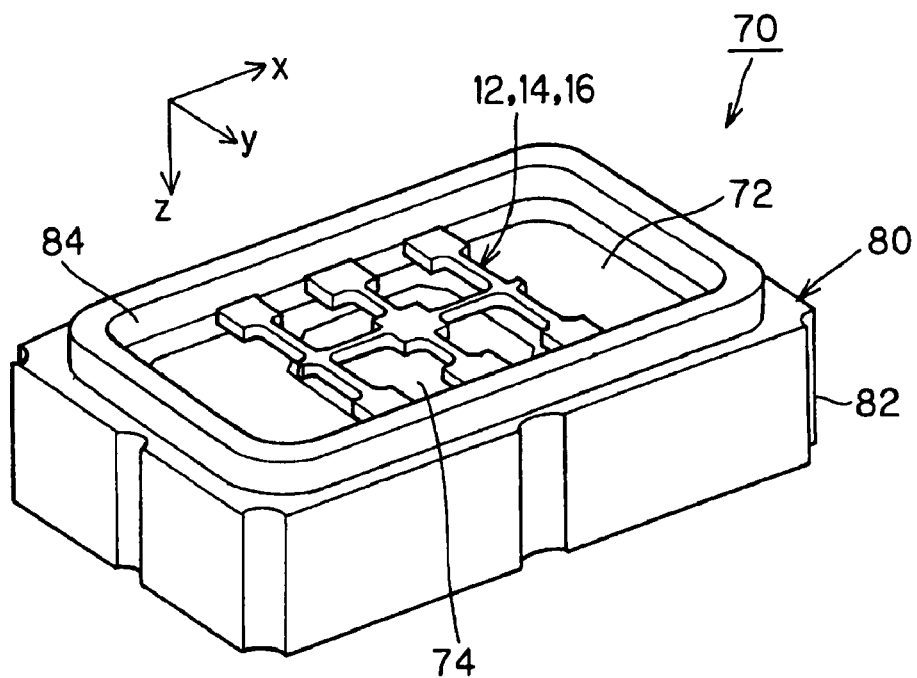
FIG. 5 is an explanatory drawing of the gyro module which is made in a package.
Figure 5B:
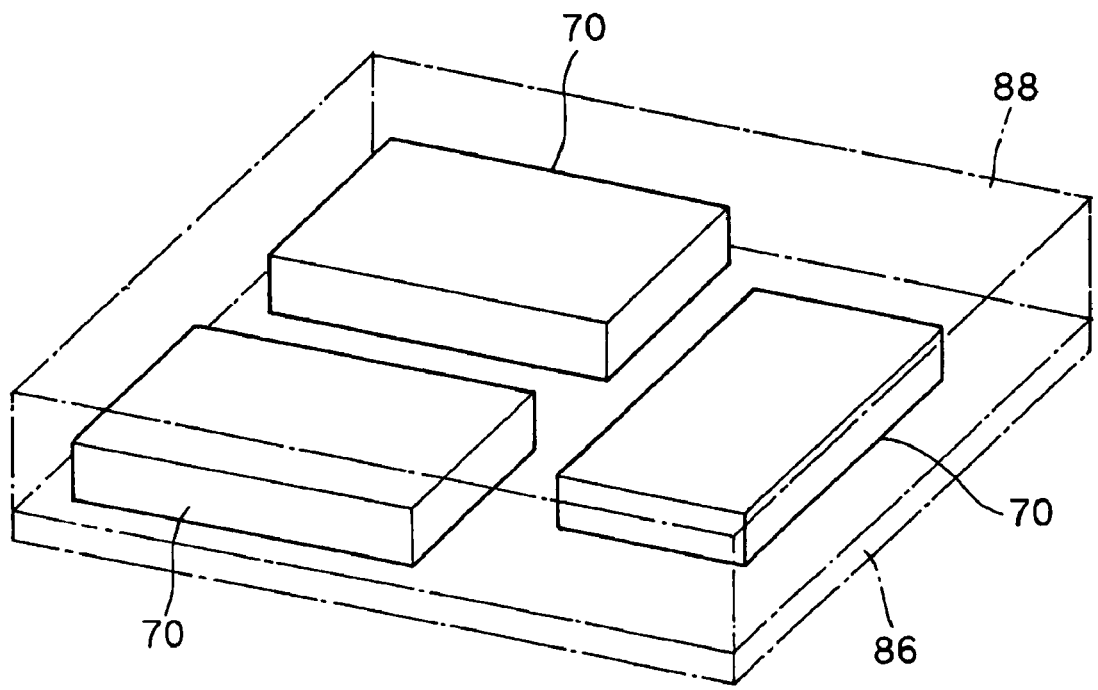

The triaxial gyro module 10 can be made in a package. FIG. 5 is an explanatory drawing of the triaxial gyro module which is made in a package. FIG. 5A is a perspective view of the gyro element and FIG. 5B is a schematic perspective view of the triaxial gyro module. Referring to FIG. 5A, the above-described gyro element components 12, 14, 16 can be placed in a package 80 as shown in the drawing, making all together as the gyro element 70. In this case, the gyro element components 12, 14, 16 are provided over a middle substrate 72 (see FIG. 7A). The middle substrate 72 has a device hole in at the center. A lead wire 76 (a lead electrode) is provided in the plural number on a lower face or an inter layer of the middle substrate 72. The end part of the lead wire 76 exposes its upper side of the metal face out of the device hole 74 and the upper part of the lead wire 76 is bent. The base part of the gyro element component is coupled to the end part of the lead wire 76. The end part of the lead wire 76 is respectively coupled to the resonator element side mount electrode 46 which is respectively provided on the gyro element components 12, 14, 16.

The package 80 shown in FIG. 5A has a package base 82 that has a concave portion 84 which opens up in upward and a lid (unshown in the drawing) that contacts with the upper face of the package base 82 so as to close the opening of the concave portion 84. An integrated circuit (IC) chip (unshown) including the above-mentioned oscillation circuit, the middle substrate 72 on which the gyro element components 12, 14, 16 are placed and the like are provided in the concave portion 84 in the package base 82. In other words, the IC chip is mounted on the bottom face of the concave portion 84. The middle substrate 72 having the gyro element components 12, 14, 16 are placed such that the gyro element components 12, 14, 16 face upward and the gyro element components are situated over the IC chip and in the concave portion 84. In this way, the gyro element components 12, 14, 16 conduct with the IC chip through a conductive path formed on the package base 82. At the same time the IC chip conducts with an external terminal (unshown in the drawing) which is provided on the back face of the package base 82. The lid is adhered on the upper face (surface) of the package base 82 and the gyro element components 12, 14, 16 and the like are then vacuum sealed.

FIG. 5B shows an example of the triaxial gyro module 10 that uses the gyro element 70. The triaxial gyro module 10 has an insulating substrate 86. The gyro element 70 containing the first element component 12, the gyro element 70 containing the second gyro element component 14 and the gyro element 70 containing the third gyro element component 16 are provided on the insulating substrate 86. The gyro element components 12, 14, 16 are respectively directed to the directions as shown in FIG. 4. The gyro element components 12, 14, 16 conduct with the above-described operation part 20 (the first operation circuit 22 and the second operation circuit 24) through a wiring pattern formed on the insulating substrate 86. The operation part 20 may be provided in one of the IC chips which are provided respectively to each gyro element 70 or alternatively provided on the insulating substrate 86 as an external component. The gyro element 70 that contains the third gyro element component 16, and the output terminals of the operation part 20 conduct with mounted terminals (unshown in the drawing) which are provided on the back face of the insulating substrate 86 through a wiring pattern (unshown) provided on the insulating substrate 86. A resin molded member 88 is provided so as to surround the gyro element 70 on the upper face of the insulating substrate 86. The example of the triaxial gyro module 10 which is made in the single package 80 has the above-described structure.

Operation of the triaxial gyro module 10 is now described. An electric signal is supplied from the above-mentioned oscillation circuit to the driving electrode and the drive arms 36, 56 of each gyro element component are excited to vibrate. If angular velocities around the X-axis, Y-axis and Z-axis of the triaxial gyro module 10 are given to the gyro element components 12, 14, 16, at this state, the detection arms 40, 52 in each gyro element component 12, 14, 16 are excited, the excitement is transformed into an electric signal and the electric signal is outputted. At this point, the first detection axis of the third gyro element component 16 is detecting the angular velocity around the Z-axis of the triaxial gyro module 10. Referring to FIG. 1, the third gyro element component 16 outputs the electric signal which is the detection result of the third gyro element component 16 as the Z-axis output of the triaxial gyro module 10.

Electric signals which are generated by the detection of the angular velocity by the first element component 12 and the third gyro element component 16 are inputted into the first operation circuit 22 (the subtraction circuit). The first detection axes of the first element component 12 and the third gyro element component 16 are pointed in the same direction in this embodiment. Accordingly, when the signal outputted from the third gyro element component 16 is subtracted from the signal outputted from the first element component 12, the angular velocity components in the first detection axis of these gyro element components are canceled each other. Consequently, only the angular velocity component which is detected by the second detection axis is obtained. This means that even where the output signal of the angular velocity of the first element component 12 is a signal in which the Z-axis signal component and the Y-axis signal component are superposed, the signal components of the angular velocity around the Z-axis can be eliminated from the output signal of the first element component 12 by subtracting the signal component of the angular velocity around the Z-axis of the third gyro element component 16. As a result, the angular velocity around the Y-axis of the triaxial gyro module 10 is obtained. For this reason, the first operation circuit 22 subtracts the output signal of the third gyro element component 16 from the output signal of the first element component 12, and then outputs the subtraction result as the Y-axis output of the triaxial gyro module 10.

Electric signals which are generated by the detection of the angular velocity by the second gyro element component 14 and the third gyro element component 16 are inputted into the second operation circuit 24 (the subtraction circuit). The first detection axes of the second gyro element component 14 and the third gyro element component 16 are arranged in the same direction in this embodiment. Accordingly, when the signal outputted from the third gyro element component 16 is subtracted from the signal outputted from the second gyro element component 14, only the angular velocity component which is detected by the second detection axis of the second gyro element component 14 is obtained. This means that even where the output signal of the angular velocity of the second gyro element component 14 is a signal in which the Z-axis signal component and the X-axis signal component are superposed, the signal components of the angular velocity around the Z-axis can be eliminated from the output signal of the second gyro element component 14 by subtracting the signal component of the angular velocity around the Z-axis of the third gyro element component 16. As a result, the angular velocity around the X-axis of the triaxial gyro module 10 is obtained. For this reason, the second operation circuit 24 subtracts the output signal of the third gyro element component 16 from the output signal of the second gyro element component 14, and then outputs the subtraction result as the X-axis output of the triaxial gyro module 10.

This triaxial gyro module 10 can output the angular velocity components around the three detection axes separately by each axis. In other words, the triaxial gyro module 10 can conduct the detection of the angular velocity around the X-axis, the detection of the angular velocity around the Y-axis, and the detection of the angular velocity around the Z-axis.

The double T-type gyro sensor can detect the angular velocity around the detection axis which is directed to the perpendicular direction with respect to the main plane. Therefore, where the double T-type gyro sensor is adopted as the gyro element component, the main planes of the gyro element components 12, 14, 16 can be arranged along the bottom face of the package 80 when the gyro element components 12, 14, 16 are packed in the package 80. Accordingly, the main planes of the gyro element components 12, 14, 16 face along the upper face of the above-described insulating substrate 86 when the gyro element 70 is adhered to the insulating substrate 86. Consequently, it is not necessary to place the gyro element components standing in the triaxial gyro module 10 as the commonly used gyro module did, and it is possible to reduce the height of the gyro module and an unnecessary space will not be generated. In other words, the thickness of the gyro element components 12, 14, 16 can be reflected to the thickness of the triaxial gyro module 10 and thereby it is possible to downsize the triaxial gyro module 10.

Moreover, the triaxial gyro module 10 is made in the single package (module) so that such triaxial gyro module 10 can be easily mounted on a mounting substrate of an electronic apparatus. More specifically, the direction of the detection axes of the gyro element components 12, 14, 16 can be adjusted in advance when the triaxial gyro module 10 is packed in the package. A user of the triaxial gyro module 10 does not have to make adjustments for the detection axis orientation of each gyro element component 12, 14, 16 when the triaxial gyro module 10 is mounted on a mounting substrate of an electronic apparatus. In this sense the implementation process can be simplified. Furthermore, the triaxial gyro module 10 which is made in the single package is used as it maintains a high detection accuracy of the triaxial angular velocity.

The embodiment described with reference to FIG. 5 has the three gyro elements 70 which respectively have the package 80 in which the gyro element components 12, 14, 16 are contained, and the gyro elements 70 are provided on the insulating substrate 86. However, the triaxial gyro module 10 can be constructed in other configurations than the above-described embodiment. For example, the triaxial gyro module 10 can have a single package having a package base in which a concave portion is provided, and three middle substrates 72 which respectively have the gyro element components 12, 14, 16 are provided in the concave portion. This modification example has the concave portion in which three middle substrates 72 are aligned. The concave portion can be formed in anyway provided that the three pieces of the substrates be arranged therein. In other modification example, the package base can be formed to have three concave portions such that the package base has a square wave form when it is viewed in section. The middle substrate 72 is provided in each of the three concave portions. In the same way as the above embodiment, the lid is provided on the concave portion where the opening is and the gyro element components 12, 14, 16 are vacuum sealed in there. Even with the package having such structure, the triaxial gyro module 10 can be formed in a single package.

In the case where the three middle substrates 72 which have gyro element components 12, 14, 16 respectively are arranged in the plane direction in the single concave portion, the middle substrates 72 can be aligned in the same plane in the package. Accordingly, it is possible to obtain a fine planarity of the plane in which the gyro element components 12, 14, 16 are mounted. Even if the same plane in which the middle substrates 72 are arranged inclines with respect to the horizontal direction, inclination angles of the gyro element components 12, 14, 16 are the same so that it is easy to adjust the inclination angles of the gyro element components.

Alternatively, the gyro element components 12, 14, 16 can be provided in the same plane of the middle substrate 72, and the middle substrate 72 is placed in the concave portion to form the triaxial gyro module 10.

Second Embodiment

Figure 6A:
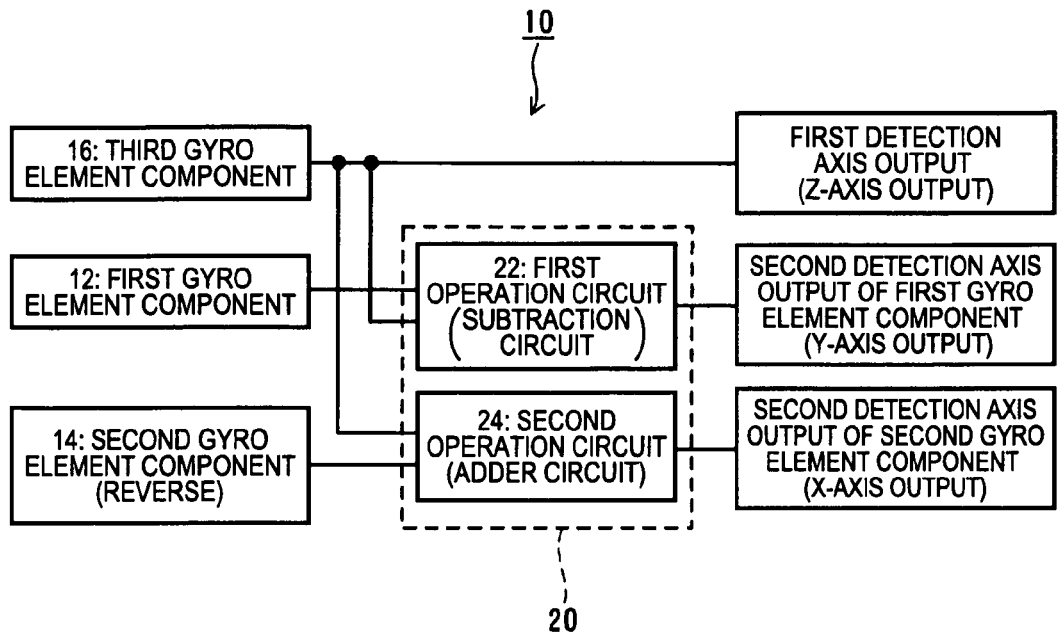
FIG. 6 is a block diagram of a gyro-module according to a second embodiment.
Figure 6B:
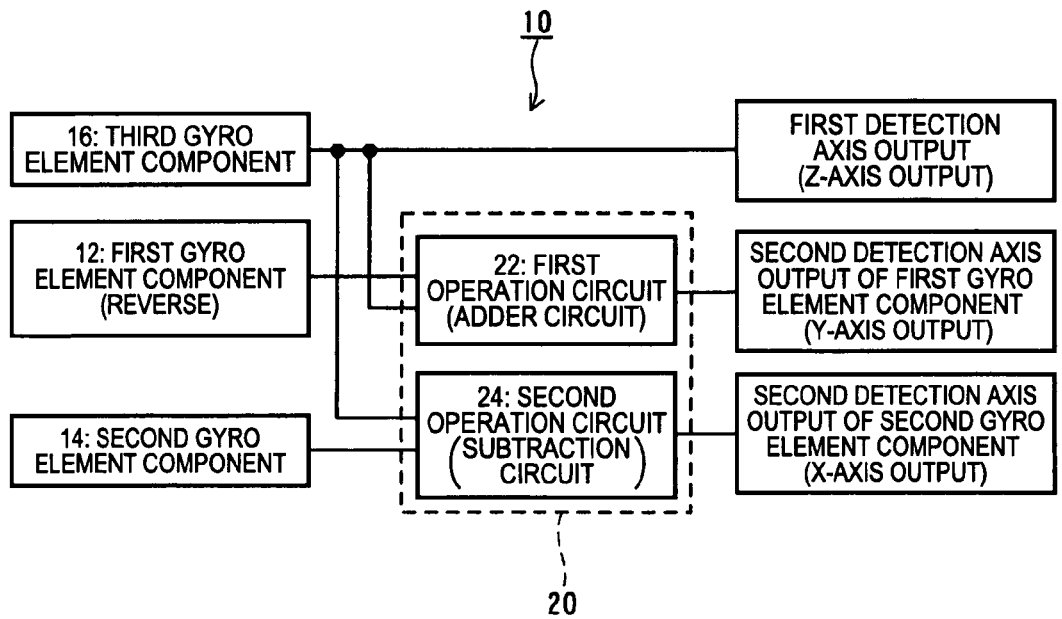

A second embodiment of the invention is now described. FIG. 6 is a block diagram of a triaxial gyro module according to the second embodiment. FIG. 6A is a block diagram of the triaxial gyro module in which the polarity of the detection sensitivity for the first detection axis of the second gyro element component is reversed. FIG. 6B is a block diagram of the triaxial gyro module in which the polarity of the detection sensitivity for the first detection axis of the first gyro element component is reversed. The triaxial gyro module 10 according to the second embodiment has the same structure as that of the triaxial gyro module 10 according to the first embodiment except that the first detection axis of either the first element component 12 or the second gyro element component 14 has an opposite detection sensitivity polarity with respect to that of the first detection axis of the third gyro element component 16. Only the different structures or points from the first embodiment will be described in the following second embodiment.

Referring to FIG. 6A, the triaxial gyro module 10 has the first detection axes of the gyro element components 12, 14, 16 which are aligned in the same direction. The first detection axis of the second gyro element component 14 has an opposite polarity in the detection sensitivity of the angular velocity around the axis to that of the first detection axes of the first gyro element component 12 and the third gyro element component 16. In other words, the second gyro element component 14 has a oppositely directed optical axis with respect to the first and third gyro element components 12, 16 (a reversed optical axis with respect to that of the first gyro element component 12 which has the identical structure with the second gyro element component 14). Even in this case, the second detection axis of the first gyro element component 12 crosses with the second detection axis of the second gyro element component 14, and they orthogonally cross each other in this embodiment. To reverse the detection sensitivity polarity of the first detection axis of the second gyro element component 14, in case of the gyro element 70 shown in FIG. 5A, for example, only the second gyro element component 14 on the middle substrate 72 is mounted on the package base 82 such that the resonator element side mount electrode 46 of the second gyro element component 14 faces upward in the concave portion 84 of the package base 82.

Figure 7A:
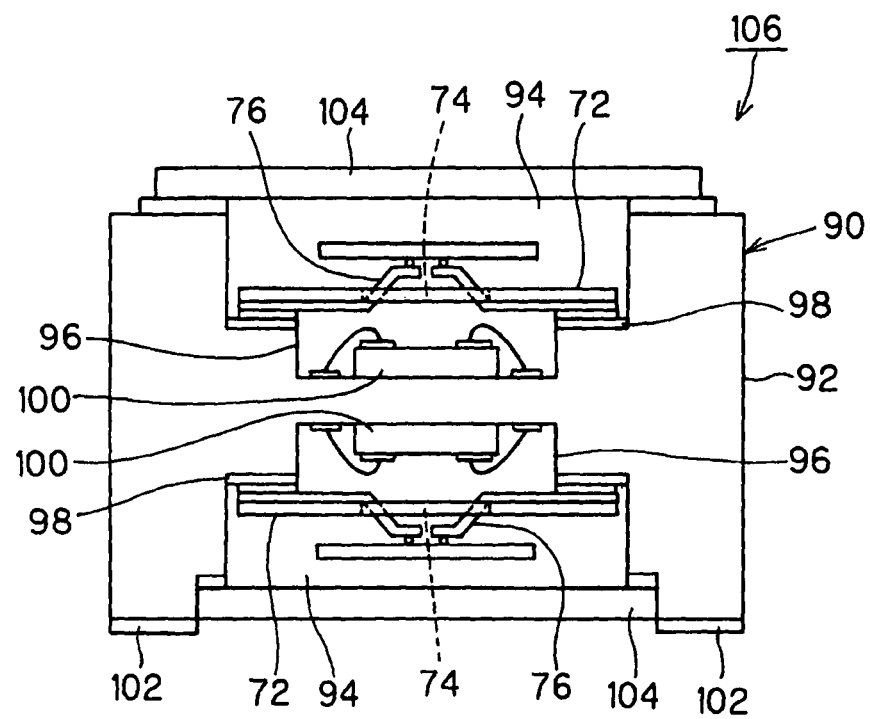
FIG. 7 is an explanatory drawing of the gyro module.
Figure 7B:
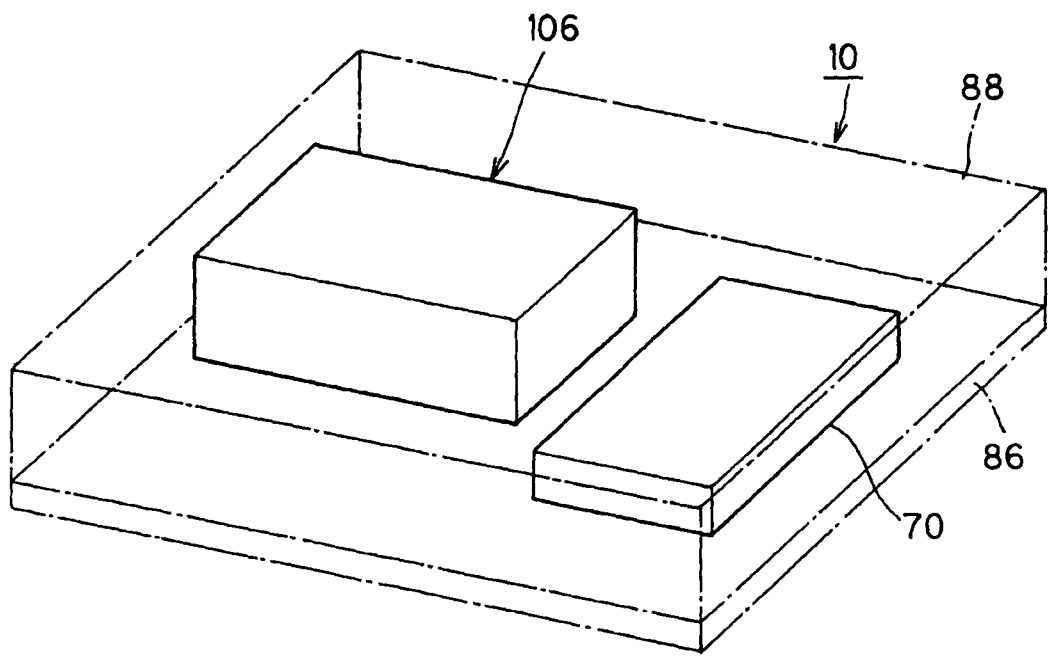

Another embodiment in which the detection sensitivity polarity of the first detection axis of the second gyro element component 14 is reversed is shown in FIG. 7. FIG. 7 is an explanatory drawing of the triaxial gyro module. FIG. 7A is a sectional view of a package in which two gyro element components is mounted. FIG. 7B is a perspective schematic view of the triaxial gyro module. A package 90 having two gyro element components includes a package base 92 in which a concave portion 94 which opens up both in upward and downward is formed. The side face of the concave portion 94 is formed in a step-like pattern. A package side mount electrode 98 on which the gyro element component is mounted is provided at the place where corresponds to the upper face of a step 96. An IC ship 100 is attached on the bottom face of each concave portion 94. A conductive pattern (unshown in the drawing) through which the IC chip 100 conducts with the package side mount electrode 98 is provided in the concave portion 94. An external terminal 102 is provided on the lower face of the package base 92 and a pattern (unshown in the drawing) through which the external terminal 102 conducts with the IC chip 100 is provided.

The IC chip 100 is adhered on the bottom face of each concave portion 94. The IC chip 100 has the above-mentioned oscillation circuit inside or on the surface. The middle substrate 72 having the gyro element component is placed in a place where corresponds to the upper face of the step 96 in the concave portion 94. Through such configuration, the gyro element component conducts with the IC chip 100 and the IC chip 100 conducts with the external terminal 102. The gyro element component that is situated in the concave portion 94 which opens upward is the third gyro element component 16 and the gyro element component that is situated in the concave portion 94 which opens downward (towards the side of the external terminal 102) is the second gyro element component 14. In this way, the first detection axis of the second gyro element component 14 points opposite with respect to the first detection axes of the first gyro element component 12 and the third gyro element component 16, making the polarity in the detection sensitivity of the first detection axis of the second gyro element component 14 reversed.

Each concave portion 94 is sealed by a lid 104 which is provided so as to close the opening of the concave portion 94. In this way, the gyro element components 14, 16 and the like are vacuum sealed. With such configuration, the two gyro element components 14, 16 can be contained in the single package 90.

The triaxial gyro module 10 shown in FIG. 7B has a gyro element 106 which is shown in FIG. 7A and the gyro element 70 in which the first gyro element 12 shown in FIG. 5A is packed in the package 80. The gyro element 106 and the gyro element 70 are mounted on the insulating substrate 86 and their peripheral is surrounded by the resin molded member 88. The triaxial gyro module 10 shown in FIG. 7B has the same configuration as the one shown in FIG. 5B. In this case, the height of the triaxial gyro module 10 is made small and the planar size is also made smaller.

As for the vacuum sealing process, the two concave portions 94 can be separately vacuum sealed, or alternatively these concave portions 94 can be vacuum sealed together in the same process.

To carry out the sealing process, for example, a through-hole that couples the concave portions 94 which are provided one above the other is formed in advance in the inner part (for example the bottom face of the concave portion) of the package base 92.

In the sealing process in this case, the opening of one concave portion 94 is closed by the lid 104 and a vacuum treatment is then carried out before the opening of the other concave portion 94 is sealed. In this way, the air in the closed concave portion 94 is exhausted out through the through-hole and the both concave portions 94 can be simultaneously made vacuum through a single vacuum treatment. Accordingly, it is possible to simplify the vacuum process.

According to the configuration in which the two IC chips 100 are provided together, the middle substrate 72 on which the other gyro element component is mounted can be placed on the bottom of the concave portion 94.

In other words, where only one IC chip 100 is provided, only the gyro element component is provided in the other concave portion 94. Thereby the package side mount electrode 98 that is coupled with the base part of the lead wire 76 can be provided on the bottom face the concave portion 94.

Moreover, in this case, the step 96 is not necessarily provided in the concave portion 94 so that it is possible to lower the height of the triaxial gyro module 10.

Furthermore, when the distance between the first gyro element 12 and the second gyro element component 14 in the Z-axis direction is set short, it is possible to minimize the difference in the detection results (absolute value) between the angular velocity around the x-axis and the angular velocity around the y-axis.

A wire-bonding process can be adopted to couple the wiring of the package base 92 to the IC chip 100/Alternatively the IC chip 100 can be bonded in a face-down manner on the package base 92 by using a flip-chip bonding technique.

Where the IC chip 100 is bonded in the face-down manner, it is not necessary to secure space in the Z-axis direction such as a space for the wire loop height in the case of the wire-bonding. Therefore, it is possible to make the height of the step 96 much smaller.

According to the embodiment, the distance between the two gyro elements in the Z-axis direction can be made smaller comparing to the case where the IC chip is wire-bonded. Thereby it is possible to minimize the difference in the detection results (absolute value) between the angular velocity around the x-axis and the angular velocity around the y-axis.

Though the IC chip is placed in the package in the above-described embodiment, the IC chip can be mounted outside the package.

If the IC chip is provided outside in the configuration where the two gyro element components are arranged such that they overlap each other as shown in FIG. 7, the external terminal 102 conducts with the detection electrode and the two middle substrates 72 can be placed on the bottom of the concave portion 94.

In this way, the distance between the two gyro elements in the Z-axis direction can be made further small thereby it is possible to minimize the difference in the detection results (absolute value) between the angular velocity around the x-axis and the angular velocity around the y-axis.

In the triaxial gyro module 10 in which the gyro element components 12, 14, 16 are arranged in the above-described way, the gyro element components 12, 14, 16 are followed by the following components as shown in FIG. 6A. More specifically, the operation part 20 is coupled to the output of the gyro element components 12, 14, 16. The operation part 20 includes the first operation circuit 22 and the second operation circuit 24. In the example shown in FIG. 6A, the first operation circuit 22 is a subtraction circuit and the second operation circuit 24 is an adder circuit.

The first operation circuit 22 is coupled to the first gyro element component 12 and the third gyro element component 16. The first operation circuit 22 conducts subtraction (operation) of the signals which are inputted from the gyro element components 12, 16, and then outputs the operation result. The result outputted by the first operation circuit 22 is the detection result of the angular velocity around the second detection axis of the first gyro element component 12, in other words, the Y-axis output of the triaxial gyro module 10.

The second operation circuit 24 is coupled to the second gyro element component 14 and the third gyro element component 16. The second operation circuit 24 conducts addition (operation) of the signals which are inputted from the gyro element components 14, 16, and then outputs the operation result. The first detection axes of the second gyro element component 14 and the third gyro element component 16 are arranged in the same direction but the orientation is opposite each other in this embodiment. Accordingly, when the signal outputted from the second gyro element component 14 is given to the signal outputted from the third gyro element component 16, the angular velocity components in the first detection axis of these gyro element components are canceled each other. Consequently, only the angular velocity component which is detected by the second detection axis of the first gyro element component 12 is obtained. As a result, the output of the second operation circuit 24 is the detection result of the angular velocity around the second detection axis of the second gyro element component 14, in other words, the X-axis output of the triaxial gyro module 10.

Moreover, the output result of the third gyro element component 16 is the detection result of the angular velocity around the first detection axis, in other words, the Z-axis output of the triaxial gyro module 10.

Referring to FIG. 6B, the triaxial gyro module 10 has the first detection axes of the gyro element components 12, 14, 16 which are aligned in the same direction. The first detection axis of the first gyro element component 12 has an opposite polarity in the detection sensitivity of the angular velocity around the axis to that of the first detection axes of the second gyro element component 14 and the third gyro element component 16. In other words, the first gyro element component 12 is reversed with respect to the second gyro element component 14 and the third gyro element component 16. Even in this case, the second detection axis of the first gyro element component 12 crosses with the second detection axis of the second gyro element component 14, and they orthogonally cross each other in this embodiment. The triaxial gyro module 10 can be made in a single package and the structure will be the same as the ones described above with reference to FIG. 5B and FIG. 7B.

In the operation part 20 that is coupled to the output sides of the gyro element components 12, 14, 16, the first operation circuit 22 which is coupled to the first gyro element component 12 and the third gyro element component 16 is an adder circuit, and the second operation circuit 24 which is coupled to the second gyro element component 14 and the third gyro element component 16 is a subtraction circuit. Accordingly, the output result of the third gyro element component 16 is the Z-axis output of the triaxial gyro module 10, the output of the first operation circuit 22 is the Y-axis output of the triaxial gyro module 10, and the output of the second operation circuit 24 is the X-axis output of the triaxial gyro module 10.

The same advantageous effects as those of the first embodiment can be obtained for the triaxial gyro module 10 according to the above-described second embodiment.

Third Embodiment

Figure 8A:
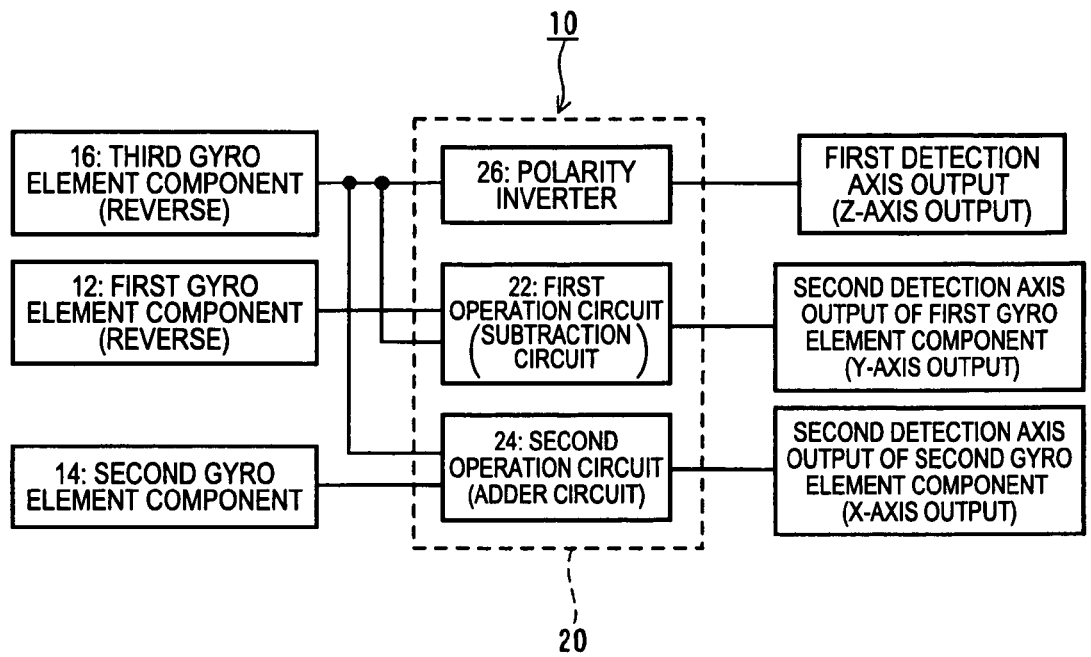
FIG. 8 is a block diagram of a gyro-module according to a third embodiment.
Figure 8B:
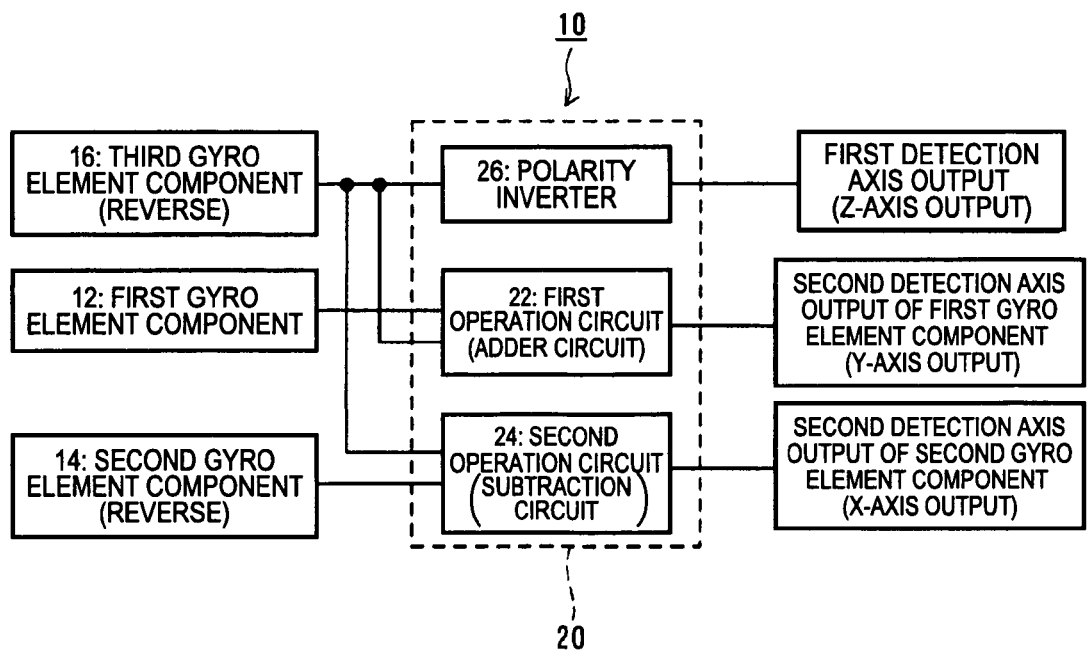

A third embodiment of the invention is now described. FIG. 8 is a block diagram of a triaxial gyro module according to the third embodiment. FIG. 8A is a block diagram of the triaxial gyro module in which the polarity of the detection sensitivity around the first detection axes of the third and first gyro element components is reversed. FIG. 8B is a block diagram of the triaxial gyro module in which the polarity of the detection sensitivity around the first detection axes of the third and second gyro element components is reversed. The triaxial gyro module 10 according to the third embodiment has the same structure as that of the triaxial gyro module 10 according to the first embodiment except that the first detection axis of either the first element component 12 or the second gyro element component 14 and the first detection axis of the third gyro element component 16 have an opposite detection sensitivity polarity with respect to that of the second gyro element component 14 or the first element component 12. Only the different structures or points from the first embodiment will be described in the following third embodiment.

Referring to FIG. 8A, the triaxial gyro module 10 has the first detection axes of the gyro element components 12, 14, 16 which are aligned in the same direction. The first detection axis of the second gyro element component 14 has an opposite polarity in the detection sensitivity of the angular velocity around the axis to that of the first detection axes of the first gyro element component 12 and the third gyro element component 16. In other words, the second gyro element component 14 has a reversed optical axis with respect to those of the first gyro element component 12 and the third gyro element component 16. Even in this case, the second detection axis of the first gyro element component 12 crosses with the second detection axis of the second gyro element component 14, and they orthogonally cross each other in this embodiment.

To reverse the detection sensitivity polarity of the first detection axes of the first gyro element component 12 and the third gyro element component 16, in case of the gyro element 70 shown in FIG. 5A, for example, only the first gyro element component 12 and the third gyro element component 16 are mounted on the package base 82 such that the resonator element side mount electrode 46 provided on the middle substrate 72 faces upward in the concave portion 84 of the package base 82. In the case of the gyro element 106 shown in FIG. 7A, for example, the second gyro element component 14 is provided in the concave portion 94 that opens upward and the third gyro element component 16 is provided in the concave portion 94 that opens downward. In this case, the first gyro element component 12 is reversed and contained in the package 80 shown in FIG. 5A. In this way, the triaxial gyro module 10 can be made in a single body as shown in FIG. 5B and FIG. 7B.

In the triaxial gyro module 10 in which the gyro element components 12, 14, 16 are arranged in the above-described way, the gyro element components 12, 14, 16 are followed by the following components as shown in FIG. 8A. More specifically, the operation part 20 is coupled to the output of the gyro element components 12, 14, 16. The operation part 20 includes the first operation circuit 22, the second operation circuit 24 and a polarity inverter 26. In the example shown in FIG. 8A, the first operation circuit 22 is the subtraction circuit and the second operation circuit 24 is the adder circuit.

The first operation circuit 22 is coupled to the first gyro element component 12 and the third gyro element component 16. The first operation circuit 22 conducts subtraction (operation) of the signals which are inputted from the gyro element components 12, 16, and then outputs the operation result. The result outputted by the first operation circuit 22 is the detection result of the angular velocity around the second detection axis of the first gyro element component 12, in other words, the Y-axis output of the triaxial gyro module 10. The second operation circuit 24 is coupled to the second gyro element component 14 and the third gyro element component 16. The second operation circuit 24 conducts addition (operation) of the signals which are inputted from the gyro element components 14, 16, and then outputs the operation result. The output of the second operation circuit 24 is the detection result of the angular velocity around the second detection axis of the second gyro element component 14, in other words, the X-axis output of the triaxial gyro module 10.

The polarity inverter 26 is coupled to the third gyro element component 16 and inverts the polarity of the signal inputted from the third gyro element component 16. In other words, the polarity of the detection sensitivity around the first detection axis of the third gyro element component 16 is reversed so that the signal outputted from the third gyro element component 16 has a negative polarity. The polarity inverter 26 processes the signal to make the polarity of the signal positive and its detection sensitivity polarity is made same as the detection sensitivity polarity around the Z-axis direction of the triaxial gyro module 10. The output of the polarity inverter 26 is the Z-axis output of the triaxial gyro module 10.

Referring to FIG. 8B, the triaxial gyro module 10 has the first detection axes of the gyro element components 12, 14, 16 which are aligned in the same direction. The first detection axis of the first gyro element component 12 has an opposite polarity in the detection sensitivity of the angular velocity around the axis to that of the first detection axes of the second gyro element component 14 and the third gyro element component 16. In other words, the second gyro element component 14 and the third gyro element component 16 is reversed with respect to the first gyro element component 12. Even in this case, the second detection axis of the first gyro element component 12 crosses with the second detection axis of the second gyro element component 14, and they orthogonally cross each other in this embodiment. The triaxial gyro module 10 can be made in a single package and the structure will be the same as the ones described above with reference to FIG. 5B and FIG. 7B.

In the operation part 20 that is coupled to the output sides of the gyro element components 12, 14, 16, the first operation circuit 22 which is coupled to the first gyro element component 12 and the third gyro element component 16 is the adder circuit, and the second operation circuit 24 which is coupled to the second gyro element component 14 and the third gyro element component 16 is the subtraction circuit. Accordingly, the output of the first operation circuit 22 is the Y-axis output of the triaxial gyro module 10, and the output of the second operation circuit 24 is the X-axis output of the triaxial gyro module 10. The polarity inverter 26 is coupled to the output side of the third gyro element component 16. The polarity inverter 26 inverts the polarity of the signal inputted from the third gyro element component 16. The output of the polarity inverter 26 is the Z-axis output of the triaxial gyro module 10.

The same advantageous effects as those of the first embodiment can be obtained for the triaxial gyro module 10 according to the above-described third embodiment.

Fourth Embodiment

Figure 9A:
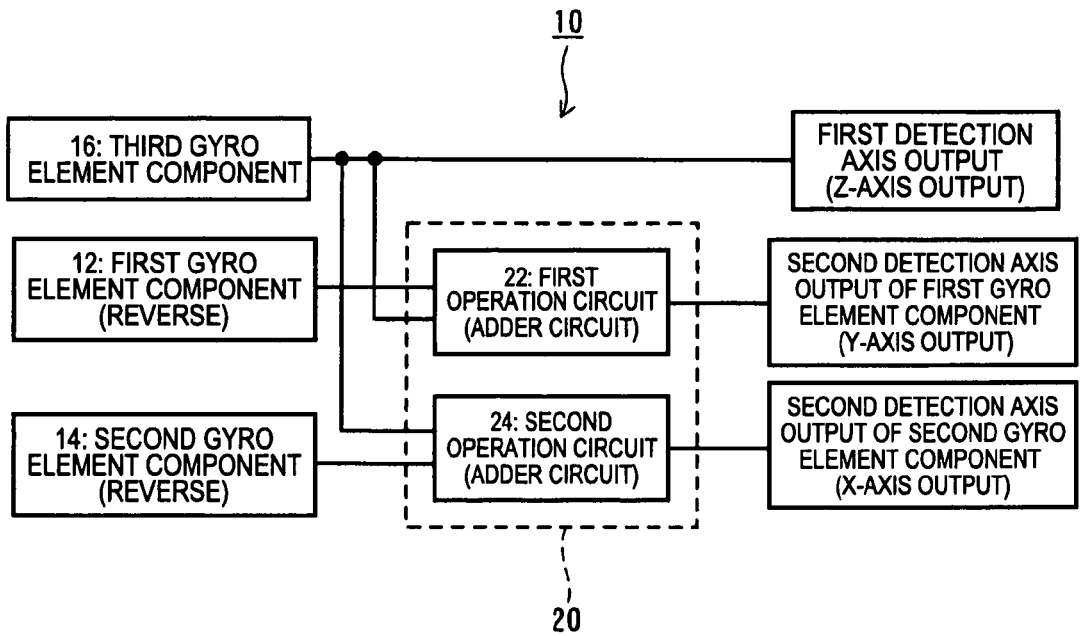
FIG. 9 is a block diagram of a gyro-module according to a fourth embodiment.
Figure 9B:
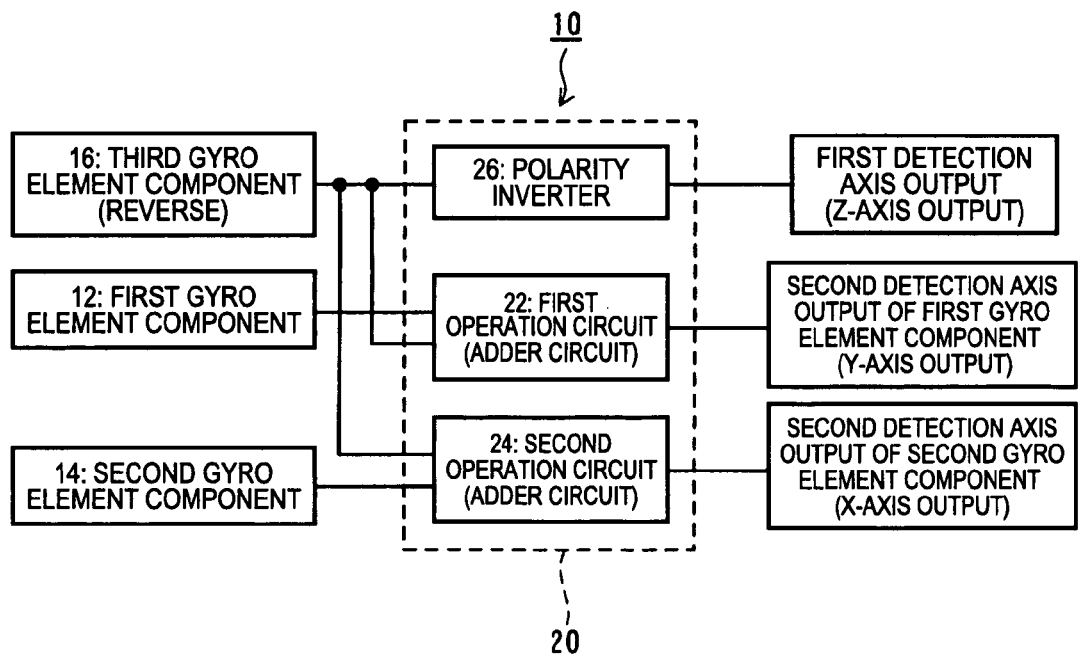

A fourth embodiment of the invention is now described. FIG. 9 is a block diagram of a triaxial gyro module according to the fourth embodiment. FIG. 9A is a block diagram of the triaxial gyro module in which the polarity of the detection sensitivity around the first detection axes of the first and second gyro element components is reversed. FIG. 9B is a block diagram of the triaxial gyro module in which the polarity of the detection sensitivity around the first detection axis of the third gyro element component is reversed. The triaxial gyro module 10 according to the fourth embodiment has the same structure as that of the triaxial gyro module 10 according to the first embodiment except that the first detection axes of the first element component 12 and the second gyro element component 14 have an opposite detection sensitivity polarity with respect to that of the third gyro element component 16. Only the different structures or points from the first embodiment will be described in the following fourth embodiment.

Referring to FIG. 9A, the triaxial gyro module 10 has the first detection axes of the gyro element components 12, 14, 16 which are aligned in the same direction. The first detection axes of the first gyro element component 12 and the second gyro element component 14 have an opposite polarity in the detection sensitivity of the angular velocity to that of the first detection axis of the third gyro element component 16. In other words, the first gyro element component 12 and the second gyro element component 14 have a reversed optical axis with respect to that of the third gyro element component 16. Even in this case, the second detection axis of the first gyro element component 12 crosses with the second detection axis of the second gyro element component 14, and they orthogonally cross each other in this embodiment.

To reverse the detection sensitivity polarity of the first detection axes of the first gyro element component 12 and the second gyro element component 14, in case of the gyro element 70 shown in FIG. 5A, for example, only the first gyro element component 12 and the second gyro element component 14 are mounted downward on the package base 82 such that the resonator element side mount electrode 46 provided on the middle substrate 72 faces upward in the concave portion 84 of the package base 82. In the case of the gyro element 106 shown in FIG. 7A, for example, the third gyro element component 16 is provided in the concave portion 94 that opens upward, and either the first gyro element component 12 or the second gyro element component 14 is provided in the concave portion 94 that opens downward. In this case, either the second gyro element component 14 or the first gyro element component 12 which has not been provided yet is reversed and contained in the package 80 shown in FIG. 5A. In this way, the triaxial gyro module 10 can be made in a single body as shown in FIG. 5B and FIG. 7B.

In the operation part 20 that is coupled to the output sides of the gyro element components 12, 14, 16, the first operation circuit 22 which is coupled to the first gyro element component 12 and the third gyro element component 16 is the adder circuit, and the second operation circuit 24 which is coupled to the second gyro element component 14 and the third gyro element component 16 is the adder circuit. Accordingly, the output of the third gyro element component 16 is the Z-axis output of the triaxial gyro module 10, the output of the first operation circuit 22 is the Y-axis output of the triaxial gyro module 10, and the output of the second operation circuit 24 is the X-axis output of the triaxial gyro module 10.

Referring to FIG. 9B, the triaxial gyro module 10 has the first detection axes of the gyro element components 12, 14, 16 which are aligned in the same direction. The first detection axes of the first gyro element component 12 and the second gyro element component 14 have an opposite polarity in the detection sensitivity to that of the first detection axis of the third gyro element component 16. In other words, the third gyro element component 16 is reversed with respect to the first gyro element component 12 and the second gyro element component 14. Even in this case, the second detection axis of the first gyro element component 12 crosses with the second detection axis of the second gyro element component 14, and they orthogonally cross each other in this embodiment.

To reverse the detection sensitivity polarity of the third gyro element component 16, in case of the gyro element 70 shown in FIG. 5A, for example, the third gyro element component 16 is mounted so as to face down on the package base 82. In the case of the gyro element 106 shown in FIG. 7A, for example, either the first gyro element component 12 or the second gyro element component 14 is provided in the concave portion 94 that opens upward, and e the third gyro element component 16 is provided in the concave portion 94 that opens downward. In this way, the triaxial gyro module 10 can be made in a single body as shown in FIG. 5B and FIG. 7B.

In the operation part 20 that is coupled to the output sides of the gyro element components 12, 14, 16, the first operation circuit 22 which is coupled to the first gyro element component 12 and the third gyro element component 16 is the adder circuit, and the second operation circuit 24 which is coupled to the second gyro element component 14 and the third gyro element component 16 is the subtraction circuit. Accordingly, the output of the first operation circuit 22 is the Y-axis output of the triaxial gyro module 10, and the output of the second operation circuit 24 is the X-axis output of the triaxial gyro module 10. The polarity inverter 26 is coupled to the output side of the third gyro element component 16. The polarity inverter 26 inverts the polarity of the signal inputted from the third gyro element component 16. The output of the polarity inverter 26 is the Z-axis output of the triaxial gyro module 10.

The same advantageous effects as those of the first embodiment can be obtained for the triaxial gyro module 10 according to the above-described fourth embodiment.

Fifth Embodiment

Figure 10:
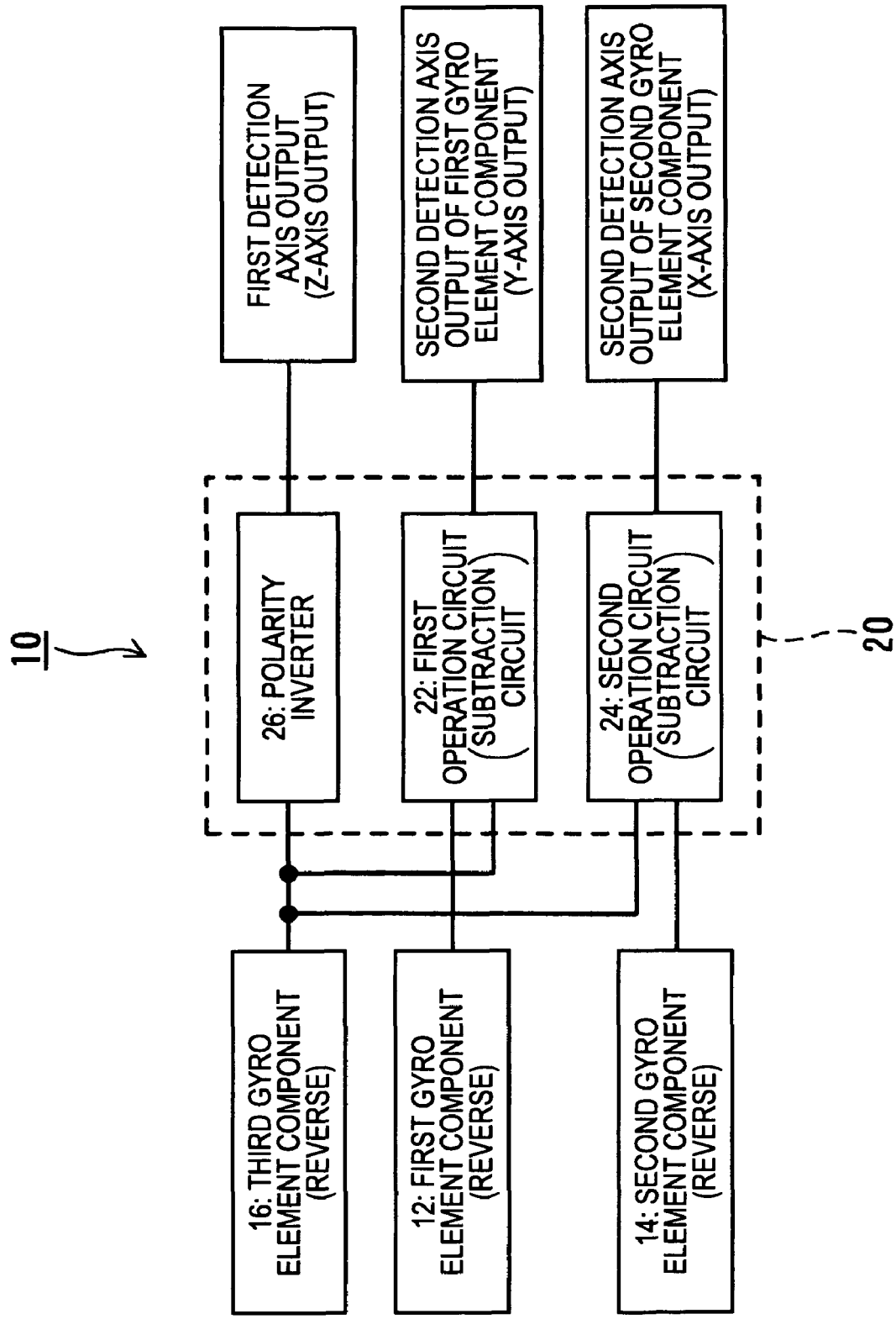
FIG. 10 is a block diagram of a gyro-module according to a fifth embodiment.

A fifth embodiment of the invention is now described. FIG. 10 is a block diagram of a triaxial gyro module according to the fifth embodiment. The triaxial gyro module 10 according to the fifth embodiment has the same structure as that of the triaxial gyro module 10 according to the first embodiment except that all of the gyro element components 12, 14, 16 are reversed to be mounted. More specifically, the first detection axes of the gyro element components 12, 14, 16 are aligned in the same direction and their orientations are also the same. However the orientation of the Z-axis of the triaxial gyro module 10 is opposite to the orientation of the first detection axes of the gyro element components 12, 14, 16. Referring to FIG. 5, such triaxial gyro module 10 can be formed from the gyro element components 12, 14, 16 which are reversed and contained in the package 80 and the gyro element 70 is formed to have a single body together.

In the operation part 20 that is coupled to the output sides of the gyro element components 12, 14, 16, the first operation circuit 22 which is coupled to the first gyro element component 12 and the third gyro element component 16 is the subtraction circuit, and the second operation circuit 24 which is coupled to the second gyro element component 14 and the third gyro element component 16 is the subtraction circuit. Accordingly, the output of the first operation circuit 22 is the Y-axis output of the triaxial gyro module 10, and the output of the second operation circuit 24 is the X-axis output of the triaxial gyro module 10. The polarity inverter 26 is coupled to the output side of the third gyro element component 16. The polarity inverter 26 inverts the polarity of the signal inputted from the third gyro element component 16. The output of the polarity inverter 26 is the Z-axis output of the triaxial gyro module 10.

The same advantageous effects as those of the first embodiment can be obtained for the triaxial gyro module 10 according to the above-described fifth embodiment.

Sixth Embodiment

A sixth embodiment of the invention is now described. FIG. 11 is a block diagram of a triaxial gyro module according to the sixth embodiment. In the sixth embodiment, all of the gyro element components are the biaxial gyro element component 30. According to the sixth embodiment, a fourth gyro element component 110 (the biaxial gyro element component 30) is used instead of the third gyro element component 16 (the uniaxial gyro element component 50) as described in the first through fifth embodiments.

Figure 11A:
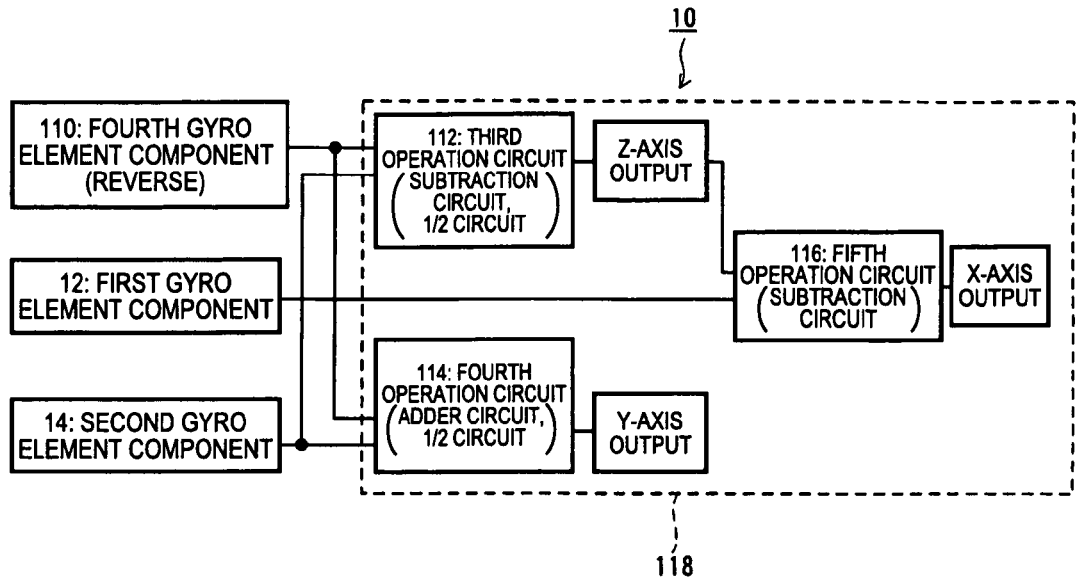
FIG. 11 is a block diagram of a gyro-module according to a sixth embodiment.

Referring to FIG. 11A, the triaxial gyro module 10 has the first detection axes of the gyro element components 12, 14, 110 which are aligned in the same direction. The first detection axis of the second gyro element component 14 has an opposite polarity in the detection sensitivity of the angular velocity around the axis to that of the first detection axis of the fourth gyro element component 110. In other words, the fourth gyro element component 110 is reversed with respect to the second gyro element component 14. The first gyro element component 12 is provided face up way. Accordingly, the orientation of the first detection axis of the first gyro element component 12 is reversed with respect to the first detection axis of the second gyro element component 14 in the example shown in FIG. 11A. The second detection axis of the second gyro element component 14 and the second detection axis of the fourth gyro element component 110 are aligned in the same direction and their orientations are the same. Furthermore the second detection axis of the first gyro element component 12 crosses with the second detection axis of the second gyro element component 14, and they orthogonally cross each other in this embodiment.

In this embodiment, the first detection axes of the gyro element components 12, 14, 110 are placed along the Z-axis of the triaxial gyro module 10, the second detection axes of the second gyro element component 14 and the fourth gyro element component 110 are placed along the Y-axis of the triaxial gyro module 10, and the second detection axis of the first gyro element component 12 is placed along the X-axis of the triaxial gyro module 10.

This triaxial gyro module 10 in which the detection axes of the gyro element components 12, 14, 110 are arranged in the above-described way can also be formed in a single module.

In the triaxial gyro module 10 in which the detection axes of the gyro element components 12, 14, 110 are arranged in the above-described way, an operation part 118 that couples the output side of the gyro element components 12, 14, 110 has the following structure. The operation part 118 includes a third operation circuit 112, a fourth operation circuit 114 and a fifth operation circuit 116.

The third operation circuit 112 conducts subtraction of inputted signals and reduces the signal level to half. The third operation circuit 112 is coupled to the second gyro element component 14 and to the fourth gyro element component 110. The third operation circuit 112 carries out the subtraction of the signals inputted from the gyro element components 14, 110 and then halves the level of the signals after the subtraction. The third operation circuit 112 outputs this operation result. The second detection axes of the second gyro element component 14 and the fourth gyro element component 110 are arranged in the same direction. Accordingly, when the signal outputted from the second gyro element component 14 is subtracted from the signal outputted from the fourth gyro element component 110, the angular velocity components around the second detection axes of these gyro element components are canceled each other. The first detection axes of the second gyro element component 14 and the fourth gyro element component 110 are arranged in the same direction but the orientation is opposite each other. Accordingly, when the subtraction of the signals outputted from these gyro element components is conducted, the signals are given and only the angular velocity component around the first detection axis can be obtained. Alternatively, the third operation circuit 112 can firstly halves the signal level of the signals inputted from the second and fourth gyro element components 14, 110, then can conduct the subtraction and output the operation result. The result outputted by the third operation circuit 112 is the detection result of the angular velocity around the first detection axes of the second and fourth gyro element components 14, 110, in other words, the Z-axis output of the triaxial gyro module 10.

The fourth operation circuit 114 conducts addition of inputted signals and reduces the signal level to half. The fourth operation circuit 114 is coupled to the second gyro element component 14 and to the fourth gyro element component 110. The fourth operation circuit 114 carries out the addition of the signals inputted from the second and fourth gyro element components 14, 110 and then halves the level of the signals after the addition. The fourth operation circuit 114 outputs this operation result. The first detection axes of the second gyro element component 14 and the fourth gyro element component 110 are arranged in the same direction but the orientation is opposite each other. Accordingly, the angular velocity components in the first detection axis of these gyro element components are canceled each other through the addition. Consequently, only the angular velocity component detected by the second detection axes of the second and fourth gyro element components 14, 110 is obtained. Alternatively, the fourth operation circuit 114 can firstly halves the signal level of the signals inputted from the gyro element components 14, 110, then can conduct the addition and output the operation result. The result outputted by the fourth operation circuit 114 is the detection result of the angular velocity around the second detection axes of the gyro element components 14, 110, in other words, the Y-axis output of the triaxial gyro module 10.

The fifth operation circuit 116 is a subtraction circuit. The fifth operation circuit 116 is coupled to the first gyro element component 12 and to the third operation circuit 112. The third operation circuit 112 carries out the subtraction (operation) of the signals inputted from the first gyro element component 12 and the third operation circuit 112 then outputs the operation result. The first detection axis of the first gyro element component 12 corresponds to the Z-axis of the triaxial gyro module 10. Accordingly, when the signal outputted from the third operation circuit 112 is subtracted from the signal outputted from the first gyro element component 12, the angular velocity components around the first detection axes of these gyro element components are canceled each other. Consequently, only the angular velocity component detected by the second detection axis of the first gyro element component 12 is obtained. The output of the fifth operation circuit 116 is the X-axis output of the triaxial gyro module 10.

In the embodiment shown in FIG. 11A, the orientation of the second gyro element component 14 is opposite to that of the fourth gyro element component 110. For this reason, the second gyro element component 14 can be provided reversed and the fourth gyro element component 110 can be provided face-up. Even in this case, the first gyro element component 12 is placed face-up.

Figure 11B:
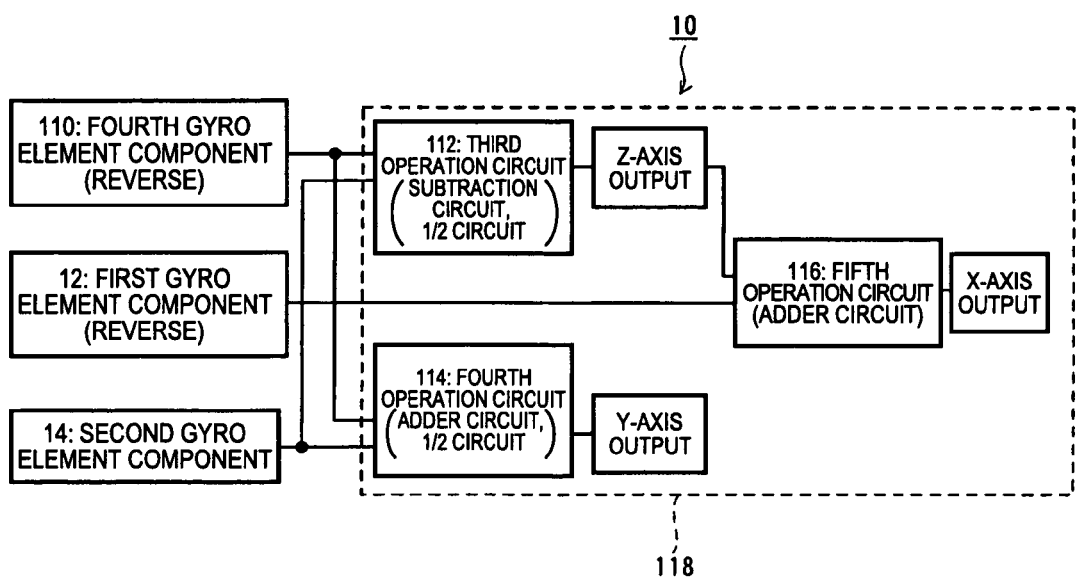

Referring to FIG. 11B, the triaxial gyro module 10 has the first detection axes of the gyro element components 12, 14, 110 which are aligned in the same direction. The first detection axis of the second gyro element component 14 has an opposite polarity in the detection sensitivity to that of the first detection axes of the first and fourth gyro element components 12, 110. In other words, the first gyro element component 12 and the fourth gyro element component 110 are reversed with respect to the second gyro element component 14. The second detection axis of the second gyro element component 14 and the second detection axis of the fourth gyro element component 110 are aligned in the same direction and their orientations are the same. Furthermore the second detection axis of the first gyro element component 12 crosses with the second detection axis of the second gyro element component 14, and they orthogonally cross each other in this embodiment. The triaxial gyro module 10 in which the detection axes of the gyro element components 12, 14, 110 are arranged in the above-described way can also be made into a single module in the same way as the above-described embodiments.

In the triaxial gyro module 10 in which the detection axes of the gyro element components 12, 14, 110 are arranged in the above-described way, the operation part 118 that couples the output side of the gyro element components 12, 14, 110 has the following structure. The operation part 118 includes the third operation circuit 112, the fourth operation circuit 114 and the fifth operation circuit 116. The third operation circuit 112 and the fourth operation circuit 114 have the same structure as the one described above with reference to FIG. 11A. The fifth operation circuit 116 has the same structure as the one described above with reference to FIG. 11A except for the adder circuit instead. The fifth operation circuit 116 conducts the addition (operation) of the signal inputted from the first gyro element component 12 and the signal inputted from the third operation circuit 112 and then outputs the operation result. The result outputted by the fifth operation circuit 116 is the detection result of the angular velocity around the second detection axis of the first gyro element component 12, in other words, the X-axis output of the triaxial gyro module 10.

The same advantageous effects as those of the first embodiment can be obtained for the triaxial gyro module 10 according to the above-described sixth embodiment.

Moreover, the gyro element component having the structure shown in FIG. 2 can be adopted as the all of the three gyro element components 12, 14, 110. This means that the same component can be used to form the triaxial gyro module 10 and the production efficiency can be improved in this sense.

Though in the triaxial gyro module 10 shown in FIG. 11A and the triaxial gyro module 10 shown in FIG. 11B, the circuit that halves a signal level is provided in the third operation circuit 112 and the fourth operation circuit 114, the embodiment is not necessarily limited to this. The circuit that halves a signal level is not necessarily provided in the third operation circuit 112 and the fourth operation circuit 114. In this modification case, a circuit that doubles the signal level which is inputted from the first gyro element component 12 is provided in the fifth operation circuit 116. The fifth operation circuit 116 doubles the signal level inputted from the first gyro element component 12, and subtraction or addition (operation) of the doubled signal and the signal inputted from the third operation circuit 112 is performed. In this way, the X-axis output of the triaxial gyro module 10 can be obtained in this modification example.

Seventh Embodiment

Figure 12:
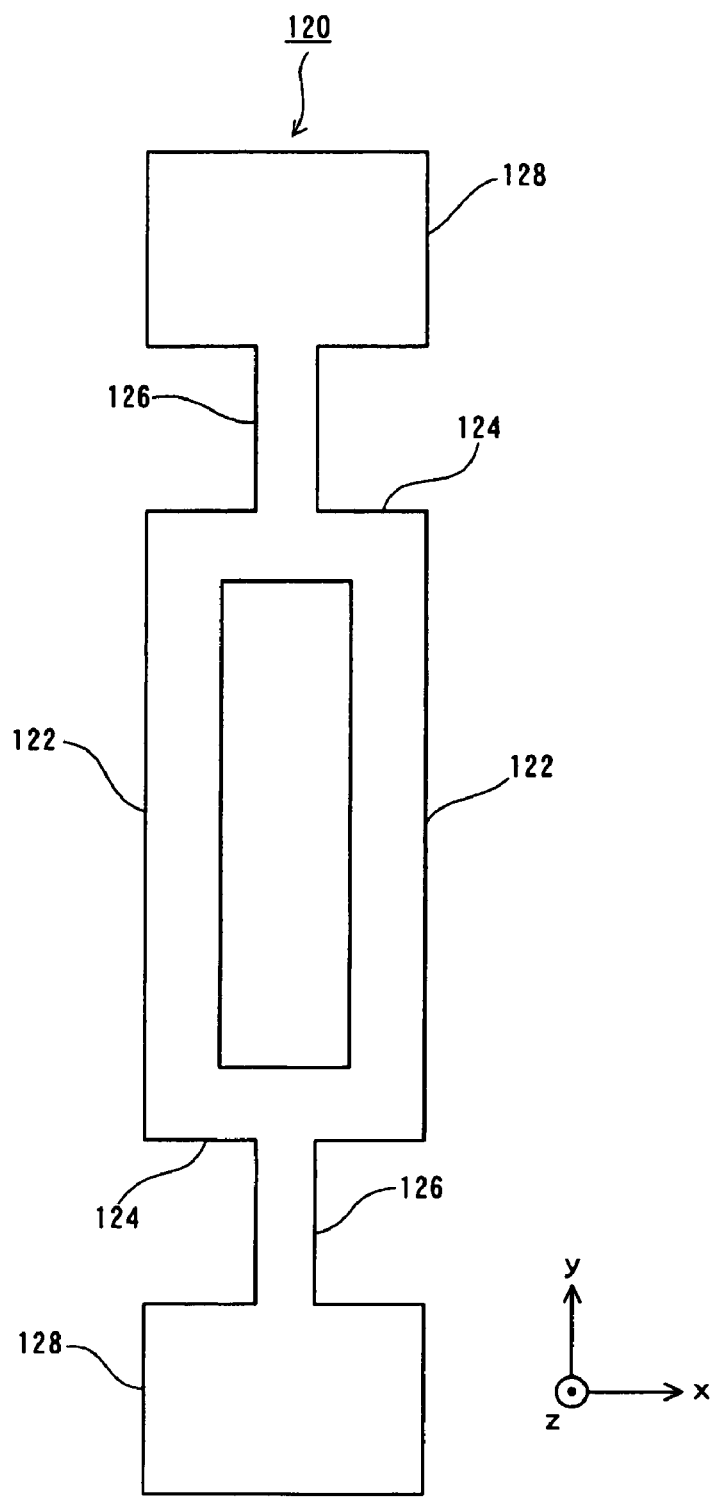
FIG. 12 is a schematic plan view of a double-ended tuning fork shaped vibrating gyro sensor.

A seventh embodiment of the invention is now described. The double T-type gyro sensor is used for the gyro element components 12, 14, 16, 110 in the above-described embodiments. However, the embodiments are not necessarily limited to this. For example, the gyro element component can be formed by using a double-ended tuning fork shaped vibrating gyro sensor. FIG. 12 is a schematic plan view of the double-ended tuning fork shaped vibrating gyro sensor. A double-ended tuning fork shaped vibrating gyro sensor 120 is formed from a Z-cut quartz substrate which is sliced at a x-y plane defined by the x-axis and the y-axis. This main plane of the quartz substrate is the main plane of the biaxial gyro element component 30. The orthogonal direction with respect to the x-y plane is the z-axis.

The double-ended tuning fork shaped vibrating gyro sensor 120 has two vibrating arms 122. A double-ended tuning fork supporting part 124 is provided at the both ends of the vibrating arms 122. The supporting part 124 has a supporting and fixing part 128 with a detection part 126 provided therebetween at the side which is opposite to the side where the vibrating arm 122 is coupled. The vibrating arm 122 serves as a driving part and a driving electrode (unshown in the drawing) is formed on the surface. When an electric signal is supplied to the driving electrode, the vibrating arms 122 move as they get close and further side to side, which is the flexure vibration. A detection electrode (unshown in the drawing) is provided on the surface of the detection part 126. When an angular velocity is given to the double-ended tuning fork shaped vibrating gyro sensor 120, the Coriolis force works and the flexure vibration is generated by the force. In this flexure vibration, the detection part 126 is also vibrated so that the vibration of the detection part 126 is converted into an electric signal through the detection electrode. This double-ended tuning fork shaped vibrating gyro sensor 120 can detect the angular velocity around the y-axis and the z-axis. Accordingly, this double-ended tuning fork shaped vibrating gyro sensor 120 can be used as the gyro element component in the triaxial gyro module 10.

Though the gyro element components 12, 14, 16, 110 are made of quartz in the triaxial gyro module 10, the embodiments are not limited to this but they can be formed from other material. For example, the gyro element components can be formed from piezoelectric material in addition to the quartz, or can be formed by using a microfabrication process of silicon (can be a micromechanical system: MEMS). Moreover, the shape of the gyro element component is not necessarily limited to the ones shown in FIG. 2, FIG. 3 and FIG. 12.

What is claimed is:

1. A gyro-module, comprising:
a first gyro element component having a first detection axis and a second detection axis, and outputting at least a signal that is based on angular velocity around the first detection axis and the second detection axis;
a second gyro element component having a first detection axis and a second detection axis, and outputting at least a signal that is based on angular velocity around the first detection axis and the second detection axis;
a third gyro element component having a first detection axis;
the first, second and third gyro elements including
a base part;

two connecting arms that extend from the base part symmetrically with respect to the base part;
a driving arm that extends from the connecting arm symmetrically with respect to the connecting arms; and
two detection arms that extend from the base part symmetrically with respect to the base part and in a direction orthogonal to the connecting arms, wherein the first gyro element component and the second gyro element component have a weight part on the detection arms and the driving arm, the weight part of the detection arms having a larger width than a weight part of the driving arm;
a first operation circuit conducting an operation of an output signal from the first gyro element component and an output signal from the third gyro element component; and
a second operation circuit conducting an operation of an output signal from the second gyro element component and an output signal from the third gyro element component, wherein
the first gyro element component, the second gyro element component and the third gyro element component are arranged in such a way that the first detection axis of the first gyro element component, the first detection axis of the second gyro element component and the first detection axis of the third gyro element component extend in a same direction and a direction in which the second detection axis of the first gyro element component is extended crosses with a direction in which the second detection axis of the second gyro element component is extended, and
the relationship between the width of the weight part of the detection arms and the width of the weight part of the driving arm satisfies the equation $5d \leq D \leq 10d$ where d is the width of the weight part of the driving arm and D is the width of the weight part of the detection arms.

2. The gyro-module according to claim 1, wherein at least one of the first gyro element component, the second gyro element component and the third gyro element component is a double-ended tuning fork shaped vibrating gyro sensor.

3. The gyro-module according to claim 1, wherein the gyro element components are made from a quartz substrate and the two detection axes of each gyro element component are an optical axis and a mechanical axis.

4. The gyro-module according to claim 1, wherein the first detection axis of the first gyro element component, the first detection axis of the second gyro element component and the first detection axis of the third gyro element component have a same polarity of detection sensitivity, and the first operation circuit and the second operation circuit are subtraction circuits.

5. The gyro-module according to claim 1, wherein the first detection axis of the first gyro element component and the first detection axis of the second gyro element component have a same polarity of detection sensitivity, the polarity in the detection sensitivity of the first detection axis of the first gyro element component is reversed to a detection sensitivity polarity of the first detection axis of the third gyro element component, and the first operation circuit and the second operation circuit are adder circuits.

6. The Gyro-module according to claim 1, wherein the first detection axis of the first gyro element component and the first detection axis of the third gyro element component have a same polarity of detection sensitivity, a polarity in the detection sensitivity of the first detection axis of the second gyro element component is reversed to the detection sensitivity polarity of the first detection axis of the third gyro element component, the first operation circuit is a subtraction circuit, and the second operation circuit is an adder circuit.

7. A gyro-module, comprising:
a first gyro element component having a first detection axis and a second detection axis, and outputting at least a signal that is based on angular velocity around the first detection axis and the second detection axis;
a second gyro element component having a first detection axis and a second detection axis, and outputting at least a signal that is based on angular velocity around the first detection axis and the second detection axis;
a third gyro element component having a first detection axis and a second detection axis, and outputting at least a signal that is based on angular velocity around the first detection axis and the second detection axis;
a first operation circuit conducting subtraction of an output signal from the second gyro element component and an output signal from the third gyro element component, and outputting a subtraction result;
a second operation circuit conducting addition of an output signal from the second gyro element component and an output signal from the third gyro element component, and outputting an addition result; and
a third operation circuit conducting an operation of an output signal from the first gyro element component and an output signal from the third gyro element component, and outputting an operation result,
wherein the first gyro element component, the second gyro element component and the third gyro element component are arranged in such a way that the first detection axis of the first gyro element component, the first detection axis of the second gyro element component and the first detection axis of the third gyro element component extend in a same direction, and a direction in which the second detection axis of the first gyro element component is extended crosses with a direction in which the second detection axis of the second gyro element component is extended.

8. The gyro-module according to claim 7, the first gyro element component, the second gyro element component and the third gyro element component respectively comprising: a base part; two connecting arms that extend from the base part symmetrically with respect to the base part; two drive arms that extend from the connecting arms symmetrically with respect to the connecting arms; two detection arms that extend from the base part symmetrically with respect to the base part and in a direction orthogonal to the connecting arm; and two weight parts that are provided on the detection arms.

* * * * *